US011865584B2

(12) United States Patent
Park

(10) Patent No.: US 11,865,584 B2
(45) Date of Patent: Jan. 9, 2024

(54) DRUM-TYPE FOREIGN SUBSTANCE SUCTIONAL ATTACHING AND SCREENING DEVICE

(71) Applicant: DAEJINECOTECH CO., LTD., Gyeongsangnam-do (KR)

(72) Inventor: Jin Young Park, Gyeongsangnam-do (KR)

(73) Assignee: DAEJINECOTECH CO., LTD., Gyeongsangnam-Do (KR)

( * ) Notice: Subject to any disclaimer, the term of this patent is extended or adjusted under 35 U.S.C. 154(b) by 0 days.

(21) Appl. No.: 18/105,216

(22) Filed: Feb. 2, 2023

(65) Prior Publication Data

US 2023/0249223 A1 Aug. 10, 2023

(30) Foreign Application Priority Data

| | | |
|---|---|---|
| Feb. 4, 2022 | (KR) | 10-2022-0015022 |
| Jul. 6, 2022 | (KR) | 10-2022-0082830 |
| Jul. 27, 2022 | (KR) | 10-2022-0092974 |
| Aug. 25, 2022 | (KR) | 10-2022-0106963 |

(51) Int. Cl.

| | |
|---|---|
| ***B07B 9/02*** | (2006.01) |
| ***B07B 13/14*** | (2006.01) |
| ***B07B 1/42*** | (2006.01) |
| ***B07B 1/22*** | (2006.01) |

(52) U.S. Cl.

CPC .................. *B07B 9/02* (2013.01); *B07B 1/22* (2013.01); *B07B 1/42* (2013.01); *B07B 13/14* (2013.01)

(58) Field of Classification Search

CPC .. B07B 1/22; B07B 1/42; B07B 13/14; B07B 9/02; B03C 1/02

USPC ................................ 209/284, 287, 288, 289

See application file for complete search history.

(56) References Cited

U.S. PATENT DOCUMENTS 4,345,720 A * 8/1982 Takacs .................. B01D 33/11 209/288

FOREIGN PATENT DOCUMENTS

| | | | |
|---|---|---|---|
| CH | 638154 | A5 * | 3/1979 |
| CH | 638154 | A5 * | 9/1983 |
| CN | 111266286 | A * | 6/2020 |
| CN | 113967659 | A * | 1/2022 |
| JP | H09148090 | A * | 11/1995 |
| JP | H09148090 | A * | 6/1997 |
| JP | 2016120479 | A * | 7/2016 |
| KR | 20090089159 | A * | 2/2008 |
| KR | 20090089159 | A * | 8/2009 |
| KR | 20110090595 | A * | 2/2010 |
| KR | 20110090595 | A * | 8/2011 |
| KR | 10-2049250 | B1 | 11/2019 |

* cited by examiner

*Primary Examiner* — Terrell H Matthews

(74) *Attorney, Agent, or Firm* — Bridgeway IP Law Group, PLLC; Sang Ho Lee; Hyun Woo Shin

(57) ABSTRACT

A drum-type foreign substance suctional attaching and screening device includes: a screening drum having circular type first and second side plates located on both sides thereof and a sorting screen adapted to surround the space between the first and second side plates; a hood disposed inside the screening drum and open toward a conveyor belt transferring aggregates to be recycled to thus provide a sucking force generated from a suction fan to the conveyor belt; and a rotary shaft coupled to the center of the first side plate and rotating with power received from the outside.

14 Claims, 19 Drawing Sheets

DRUM-TYPE FOREIGN SUBSTANCE SUCTIONAL ATTACHING AND SCREENING DEVICE

CROSS REFERENCE TO RELATED APPLICATION OF THE INVENTION

The present application claims priority to Korean Patent Applications No. 10-2022-0015022 filed in the Korean Intellectual Property Office on Feb. 4, 2022, KR 10-2022-0082830 filed on Jul. 6, 2022, KR 10-2022-0092974, filed on Jul. 27, 2022, and KR 10-2022-0106963, filed on Aug. 25, 2022, the entire contents of which are incorporated herein by references.

BACKGROUND OF THE INVENTION

Field of the Invention

The present invention relates to a drum-type foreign substance suctional attaching and screening device that is capable of sorting iron foreign substances such as iron wires, nails, iron pieces, and the like and lightweight foreign substances such as wood pieces, plastics, Styrofoam, insulation materials, and the like, while efficiently transferring a magnetic force or sucking force to a U-shaped sectional conveyor belt, in a process where intermediate treatment of construction waste is performed to produce recycled aggregates.

Background of the Related Art

Construction waste such as concrete, asphalt, wood, iron, and soil and demolition waste such as non-sortable types of waste, plastic waste, municipal waste have increased consistently in the quantity.

To recycle the construction and demolition waste, waste sorting as pre-treatment has to be first performed. In construction waste intermediate treatment facilities, the construction and demolition waste is subjected to multi-stage crushing processes, and in this case, magnetic force sorting according to materials, screen sorting according to particle sizes, wind sorting according to weights, and centrifugal separation sorting or wet sorting according to specific gravity are combinedly applied to the construction and demolition waste, so that foreign substances are prevented from being mixedly contained in recycled aggregates.

However, it is hard to efficiently separate small iron foreign substances such as nails, iron, and the like that have been not removed yet in the magnetic force sorting process and a variety of lightweight foreign substances such as wood pieces, Styrofoam, plastics, and the like from the construction and demolition waste, thereby still requiring a lot of manual work.

To solve such problems, one of conventional sorting devices is disclosed in Korean Patent No. 10-2049250 entitled “Vibration-self adhesion-suction sorting device for foreign substance in aggregate”, and the conventional sorting device is provided with a sorter having a magnetic force sorting part and a suction sorting part disposed in parallel to each other, thereby effectively sorting metal and non-metal foreign substances transferred along a conveyor belt.

In this case, the conveyor belt provided to the form of a circular track is configured to have a flat underside. However, in the case of a conveyor belt having a U-shaped section, it is difficult that a magnetic force or sucking force is transferred equally to the conveyor belt.

So as to provide the circular track, further, a plurality of rotary shafts and coupling members to the conveyor belt have to be required, thereby causing a need for a device capable of being simple in configuration and consistently transferring a sorting screen. In addition, it is hard to sort the foreign substances covered with aggregates owing to the weights of the aggregates, and therefore, studies of a method for removing the foreign substances covered with the aggregates have to be made.

SUMMARY OF THE INVENTION

Accordingly, the present invention has been made in view of the above-mentioned problems occurring in the related art, and it is an object of the present invention to provide a drum-type foreign substance suctional attaching and screening device that is capable of being simple in configuration to efficiently sort iron foreign substances such as iron wires, nails, iron pieces, and the like and lightweight foreign substances such as wood pieces, plastics, Styrofoam, insulation materials, and the like from construction and demolition waste.

To accomplish the above-mentioned objects, according to the present invention, there is provided a drum-type foreign substance suctional attaching and screening device including: a screening drum having circular type first and second side plates located on both sides thereof and a sorting screen adapted to surround the space between the first and second side plates; a hood disposed inside the screening drum and open toward a conveyor belt transferring aggregates to be recycled to thus provide a sucking force generated from a suction fan to the conveyor belt; and a rotary shaft coupled to the center of the first side plate and rotating with power received from the outside, wherein the sucking force supplied to the hood is applied to lightweight foreign substances contained in the aggregates transferred along the conveyor belt through the sorting screen, so that the lightweight foreign substances are transferred in a rotating direction of the screening drum, while being attached to the sorting screen, and then discharged in a section where the sucking force is not provided.

According to the present invention, desirably, the screening drum may be disposed parallel to the advancing direction of the conveyor belt, and the hood may have the underside with the shape of an arch, so that the sucking force generated therefrom may be applied equally to top of the conveyor belt having a U-shaped section.

According to the present invention, desirably, the screening drum may include connection frames adapted to connect the first and second side plates to each other and support the sorting screen.

According to the present invention, desirably, the suction fan may be disposed inside or outside the screening drum.

According to the present invention, desirably, the device may further include auxiliary wheels adapted to support the load of the screening drum, each auxiliary wheel coming into contact with the outer peripheral surface of the second side plate to interlockingly rotate with the second side plate.

According to the present invention, desirably, the sorting screen may be formed by coupling sorting screen modules each defined to a given size to one another.

According to the present invention, desirably, a pair of screening drums as the screening drum may be spaced part from each other by a given distance, while having first side plates facing each other, the hoods may be disposed inside the pair of screening drums, and the rotary shaft may be coupled to the centers of the first side plates of the pair of screening drums and thus rotate with the power received from the outside.

According to the present invention, desirably, the device may further include a support frame for supporting the rotary shaft thereagainst.

According to the present invention, desirably, the device may further include cantilever arms adapted to support the hood, each cantilever arm having one end fixed to the outside of the corresponding screening drum and the other end inserted into the corresponding screening drum through an open hole of the second side plate.

According to the present invention, desirably, the device may further include a magnetic attaching drum configured to have circular type first and second side plates located on both sides thereof, sorting films surrounding the space between the first and second side plates, and a magnetic force sorter mounted therein to provide a magnetic force so that the magnetic attaching drum sorts iron foreign substances by means of the magnetic force, wherein the screening drum is located spaced apart from the magnetic attaching drum by a given distance to allow a first side plate to face the first side plate of the magnetic attaching drum, and the rotary shaft is coupled to the centers of the first side plates of the screening drum and the magnetic attaching drum and thus rotates with the power received from the outside, so that the magnetic force generated from the magnetic force sorter of the magnetic attaching drum is applied to the iron foreign substances transferred along the conveyor belt from the sorting films, and the iron foreign substances are then transferred in the rotating direction of the magnetic attaching drum in a state of being attached to the sorting films and thus discharged in a section where the magnetic force is not provided, thereby sorting the iron foreign substances and the lightweight foreign substances contained in the aggregates transferred along the conveyor belt in one direction sequentially.

According to the present invention, desirably, the magnetic force sorter may be configured to have a plurality of magnetic members spaced apart from the sorting films in a lower portion of the inner space of the magnetic attaching drum and each having a plurality of permanent magnets laminated on top of one another, so that the magnetic force sorter may apply the magnetic forces generated from the magnetic members in a downward direction.

According to the present invention, desirably, the magnetic force sorter may be configured to allow the plurality of magnetic members to be arranged radially at equal angles on the center points of the first and second side plates, while the undersides of the magnetic members are being located close and parallel to the tangent lines of the sorting films.

According to the present invention, desirably, the device may further include cantilever arms each having one end fixed to the outside of the magnetic attaching drum and the other end inserted into the magnetic attaching drum through an open hole of the second side plate, the magnetic force sorter including: fixing brackets disposed on the cantilever arms to fix the cantilever arms thereto; and a plurality of cases spaced apart from the sorting films by means of the fixing brackets and accommodating the magnetic members therein.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 6 to 8 are side views showing other examples of the auxiliary wheels, wherein FIG. 6 shows a state where auxiliary gears are mounted as the auxiliary wheels, FIG. 7 shows a state where auxiliary sprockets as the auxiliary wheels, and FIG. 8 shows a state where chains as the auxiliary wheels;

DETAILED DESCRIPTION OF THE PREFERRED EMBODIMENTS

Figure 1:
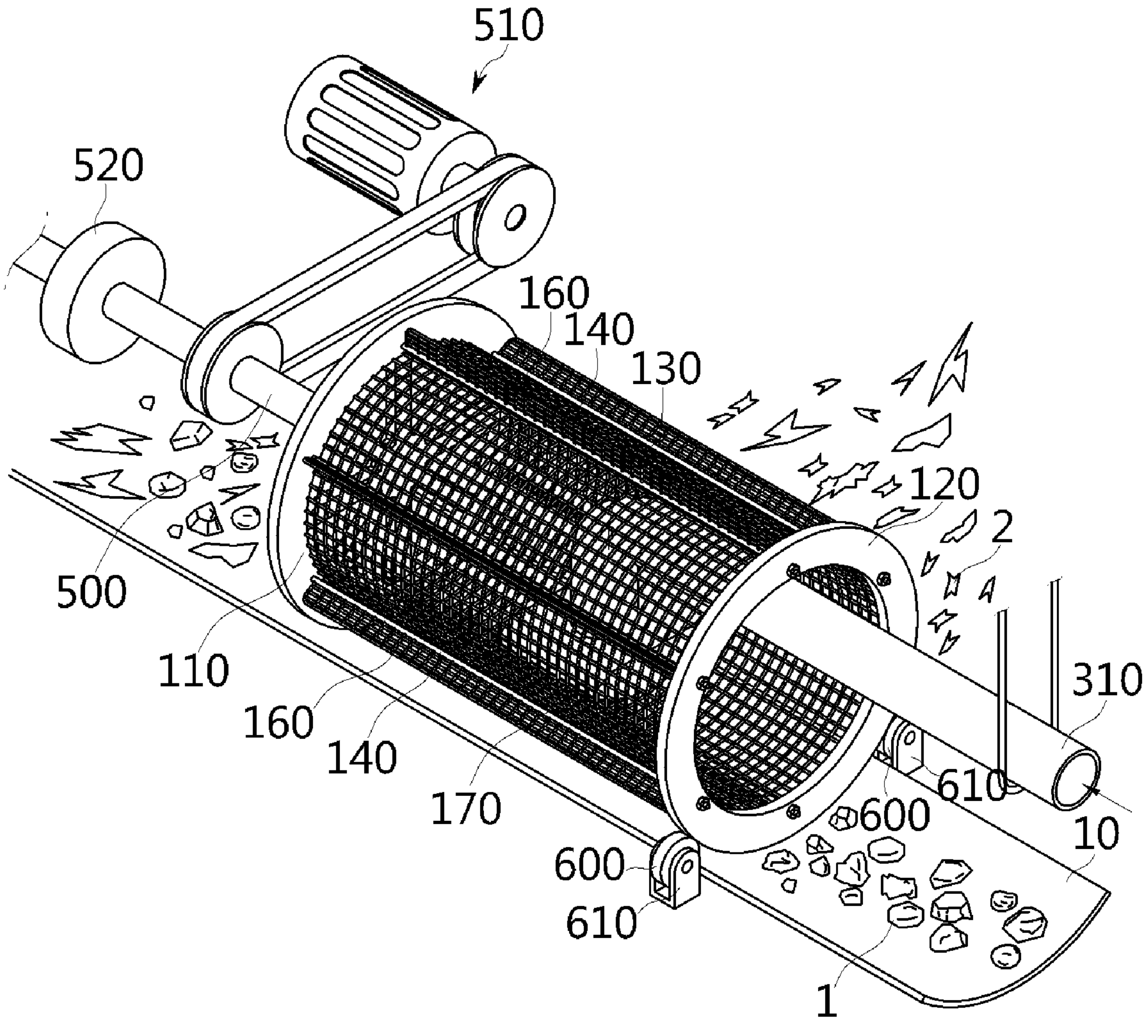
FIG. 1 is a perspective view showing a drum-type foreign substance suctional attaching and screening device according to the present invention.

Hereinafter, the present invention will be explained in detail with reference to the attached drawings.

Referring to FIGS. 1 to 4, a drum-type foreign substance suctional attaching and screening device includes: a screening drum 100 having circular type first and second side plates 110 and 120 located on both sides thereof and a sorting screen 130 adapted to surround the space between the first and second side plates 110 and 120; a hood 170 disposed inside the screening drum 100 and open toward a conveyor belt 10 transferring aggregates 1 to be recycled to thus provide a sucking force generated from a suction fan 400 to the conveyor belt 10; and a rotary shaft 500 coupled to the center of the first side plate 110 and rotating with power received from the outside, wherein the sucking force supplied to the hood 170 is applied to lightweight foreign substances 2 contained in the aggregates 1 transferred along the conveyor belt 10 through the sorting screen 130, so that the lightweight foreign substances 2 are transferred in a rotating direction of the screening drum 100, while being attached to the sorting screen 130, and then discharged in a section where the sucking force is not provided.

Hereinafter, in the description, the transferring direction of the conveyor belt 10 represents an axial direction of the screening drum 100, and a direction perpendicular to the axial direction on plane represents a transverse direction. Further, the directions where the first and second side plates 110 and 120 are located on the screening drum 100 represent lateral directions of the screening drum 100.

Moreover, an internal direction of the screening drum 100 with respect to the outer peripheral surface thereof represents the inside or inner end thereof, and an external direction thereof represents the outside or outer end thereof.

The aggregates 1 as the construction waste are subjected to crushing, grinding, or vibration sorting and thus used as recycled aggregates, and the aggregates 1 after crushed may contain various types of lightweight foreign substances 2 such as wood pieces, plastics, Styrofoam, and the like and iron foreign substances 3 such as iron wires, nails, iron pieces, and the like.

The screening drum 100 is configured to have the first and second side plates 110 and 120 located on both sides thereof and the sorting screen 130 adapted to surround the space between the first and second side plates 110 and 120.

In this case, the underside of the screening drum 100 is spaced apart from the conveyor belt 10 by a given distance. Further, the screening drum 100 is disposed parallel to the advancing direction of the conveyor belt 10.

Figure 2:
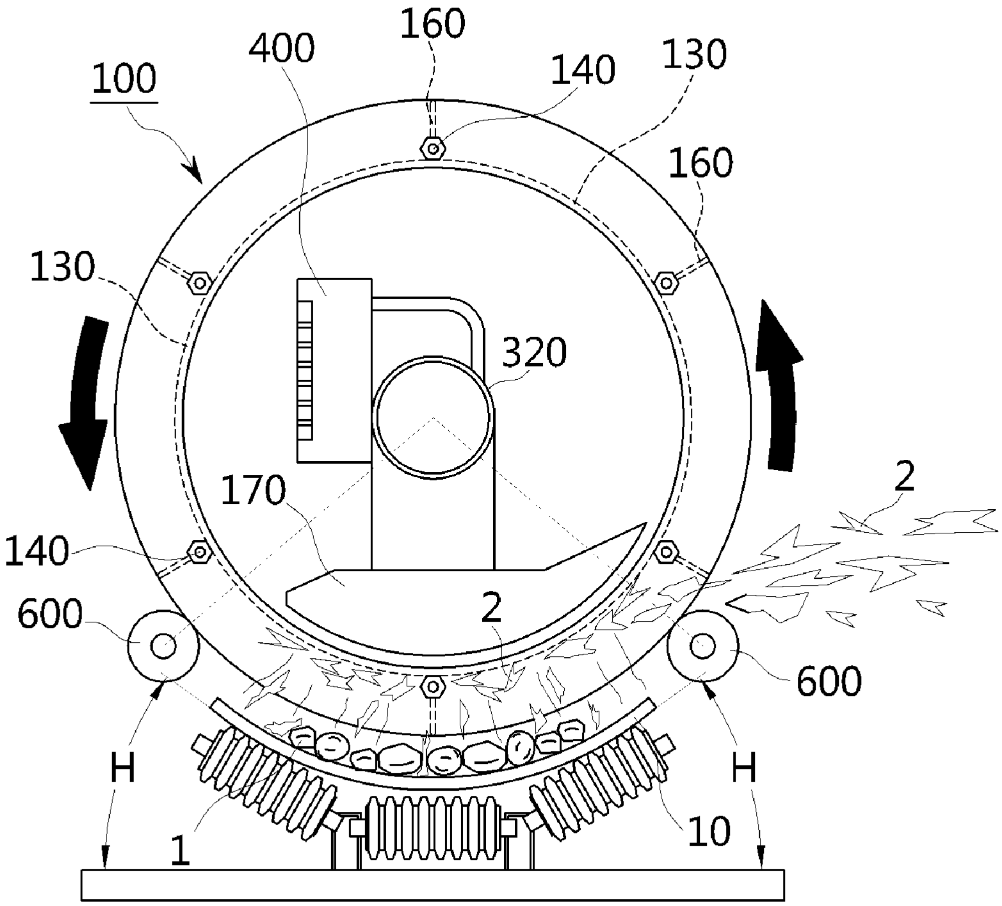
FIG. 2 is a concept view showing a process where foreign substances escape in a section where a sucking force is not provided, while moving in a state of being attached to a sorting screen of a screening drum of the device according to the present invention.

Accordingly, in the case of a sectional view showing the screening drum 100 and the conveyor belt 10 that are vertically cut in the advancing direction thereof, as shown in FIG. 2, in a state where the conveyor belt 10 having a U-shaped section is located to face the screening drum 100 having a circular sectional shape, the underside of the screening drum 100 is spaced apart from top of the conveyor belt 10 by the given distance.

The screening drum 100 has the shape of a drum with an accommodation space formed in the interior thereof, and accordingly, the screening drum 100 includes the first and second side plates 110 and 120 located on both sides thereof and connection frames 140 adapted to connect the first and second side plates 110 and 120 to each other.

The connection frames 140 are equally spaced apart from one another along the peripheries of the first and second side plates 110 and 120 facing each other to thus provide a cylindrical structure in the space between the first and second side plates 110 and 120. The connection frames 140 may be disposed on the end peripheries of the first and second side plates 110 and 120, and otherwise, they may be spaced apart from the peripheries of the first and second side plates 110 and 120 by a given distance in a concentric direction toward the center of the rotary shaft 500. If the connection frames 140 are disposed on the end peripheries of the first and second side plates 110 and 120, members for supporting external forces occupy small areas on the coupled portions of the connections frames 140 and the first and second side plates 110 and 120, so that the first and second side plates 110 and 120 may be cracked or broken. Accordingly, it is desirable that the connection frames 140 should be disposed spaced apart from the peripheries of the first and second side plates 110 and 120 by the given distance.

Further, if the connection frames 140 are disposed spaced apart from the peripheries of the first and second side plates 110 and 120 by the given distance in the direction of the rotary shaft 500, it is easy to install return prevention screens 160 as will be discussed later. If the return prevention screens 160 are disposed to the same height as the spaced distance, they do not protrude outward from the first and second side plates 110 and 120 to provide a good outer appearance, and further, the sides of the return prevention screens 160 are covered with the connection frames 140 to prevent the foreign substances from scattering to the sides of the screening drum 100, thereby preventing the return prevention screens 160 from being broken.

The first and second side plates 110 and 120 each have the shape of a circular plate with a given thickness and are thus located on both sides of the screening drum 100. The first and second side plates 110 and 120 are configured to couple the connection frames 140 and the sorting screen 130 thereto, and they have to rotate by means of the rotary shaft 500 for a long time. Therefore, they are desirably made of steel and alloy steel with high stiffness so that they can be prevented from being deformed and broken because of twisting moment.

The second side plate 120 has an open hole 121 communicating with the interior of the screening drum 100, and the first side plate 110 has an open hole formed therein. Otherwise, the first side plate 110 is formed of a circular panel having no open hole. The first side plate 110 having the open hole is configured to allow the periphery of the open hole to be fitted to the outer peripheral surface of the rotary shaft 500 by means of a plurality of ribs, and contrarily, the first side plate 110 having no open hole is configured to allow the rotary shaft 500 to be coupled to the center thereof. In this case, as the first side plate 110 rotates together with the rotary shaft 500, a reinforcing member may be additionally located on a portion where the first side plate 110 and the rotary shaft 500 are coupled to each other, and otherwise, a reinforcing plate may be additionally laid onto the outer surface of the first side plate 110 so as to increase coupling strength with the rotary shaft 500.

Through the open hole of the second side plate 120, a channel pipe 300 passes.

The channel pipe 300 includes a suction pipe 310 and a discharge pipe 320.

The discharge pipe 320 of the channel pipe 300 is a channel pipe from which air is discharged by means of the rotation of the suction fan 400, and the suction pipe 310 is a channel pipe from which the sucking force generated by an air pressure difference owing to the air discharge of the suction fan 400 is provided to the hood 170.

The sorting screen 130 is formed of a mesh screen or perforated screen. The mesh screen is made by weaving a metal wire to the form of a rhombus net, a lattice net, or the like. The perforated screen is provided by making a plurality of holes in a metal plate.

The hood 170 is open toward the conveyor belt 10 transferring the aggregates, and the sucking force generated by the drive of the suction fan 400 and transferred through the suction pipe 310 is provided to the aggregates 1 transferred along the conveyor belt 10. The sucking force is applied to the aggregates 1 transferred along the conveyor belt 10 by means of the sorting screen 130 of the screening drum 100 rotating in a vertical direction to the advancing direction of the conveyor belt 10. Further, the sucking force is not sufficient in sucking the aggregates 1 but enough in sucking the lightweight foreign substances 2 such as pieces of paper, wood pieces, Styrofoam, plastics, and the like. To do this, the rotating speed of the suction fan 400 and the distance between the hood 170 and the conveyor belt 10 have to be appropriately controlled. Accordingly, the lightweight foreign substances 2 such as pieces of paper, wood pieces, Styrofoam, plastics, and the like, which are mixed with the aggregates 1, are sucked toward the hood 170. In this case, the hood 170 is open on the entire underside thereof to allow the range in which the sucking force is provided to correspond to the width of the conveyor belt 10.

FIG. 2 is a concept view showing a process where the lightweight foreign substances 2 escape from the sorting screen 130 of the screening drum 100 in a section where the sucking force is not provided, while moving in a state of being attached to the sorting screen 130 of the screening drum 100.

As shown in FIG. 2, the conveyor belt 10 transferring the aggregates 1 has the U-shaped section so as to prevent the aggregates 1 from escaping therefrom while being transferred.

Accordingly, the hood 170 has the underside with the shape of an arch, so that the sucking force generated therefrom is applied equally to top of the conveyor belt 10 having the U-shaped section. The underside of the screening drum 100 and the section of the conveyor belt 10 are U-shaped so that they can be spaced apart from each other by the given distance, and further, the hood 170 disposed inside the screening drum 100 has the arch-shaped underside.

Accordingly, the undersides of the screening drum 100 and the hood 170 and the conveyor belt 10 have the U-shaped sections so that the sucking force can be applied equally to top of the conveyor belt 10.

The existing suctional attaching and screening device has the hood with the flat underside so that it is hard that the sucking force is applied equally to top of the conveyor belt 10 with the U-shaped section, but according to the present invention, advantageously, the drum-type foreign substance suctional attaching and screening device can apply the sucking force to the conveyor belt 10 with the U-shaped section equally.

The rotary shaft 500 is coupled to the center of the first side plate 110 and thus rotates with the power received from the outside. The rotary shaft 500 serves to rotate the screening drum 100 and is desirably formed of a rod-shaped steel member for suppressing twisting moment and improving durability.

The rotary shaft 500 has an end coupled to the center of the first side plate 110 of the screening drum 100, and otherwise, the rotary shaft 500 is coupledly inserted into the screening drum 100 by a given length.

The screening drum 100 is spaced apart from the conveyor belt 10 by the given distance, while being located in the air, by means of the rotary shaft 500 coupled to the first side plate 110, and accordingly, the rotary shaft 500 is configured to support the entire load of the screening drum 100. In this case, if the rotary shaft 500 is coupledly inserted into the screening drum 100 by the given length so as to achieve more stable coupling with the first side plate 110, it can support the load of the screening drum 100 more reliably.

To locate the rotary shaft 500, first, the rotary shaft 500 is supported against a support frame 20, and a bearing is fitted to a given portion of the rotary shaft 500 coming into contact with the support frame 20. Further, a power transmitter 510 is provided to transmit the power received from the outside to the rotary shaft 500. The power transmitter 510 may have a power transmission sprocket fitted to the outer peripheral surface of the rotary shaft 500 and a power transmission chain for transferring a rotary force received from the outside to the rotary shaft 500.

According to the present invention, further, a counter weight 520 is fitted to the rotary shaft 500 to apply a vertically downward load to the rotary shaft 500.

The screening drum 100 is spaced apart from the conveyor belt 10 by the given distance, while being located in the air, by means of the rotary shaft 500 whose one end is coupled to the first side plate 110, and accordingly, the screening drum 100 is fixed to a form of a cantilever, so that a strong bending moment may be applied to the free end (portion around the second side plate 120) not coupled to the rotary shaft 500. If the screening drum 100 is used for a long time, accordingly, it may be inclined downward because of its own weight and thus come into contact with the conveyor belt 10 so that it may be damaged and broken. To avoid the occurrence of such problems, accordingly, the counter weight 520 is located on the opposite side to the free end of the screening drum 100 to apply the vertically downward load to the rotary shaft 500, so that the screening drum 100 can be prevented from being inclined downward and sagged.

In this case, the counter weight 520 has a through hole formed therein to insert the rotary shaft 500 thereinto. As the counter weight 520 is fittedly fixed to the rotary shaft 500, it applies the downward load to the rotary shaft 500. In this case, because the counter weight 520 rotates together with the rotary shaft 500, it desirably has a cylindrical shape so that it can be prevented from eccentrically rotating.

According to the present invention, the lightweight foreign substances 2 are not sucked to the interior of the hood 170 but attached to the sorting screen 130 of the screening drum 100 and thus move by a given section. Next, they drop in the section where the sucking force is not provided and are thus discharged to the outside.

In specific, the sucking force provided to the hood 170 is applied to the lightweight foreign substances 2 contained in the aggregates 1 transferred along the conveyor belt 10 by means of the sorting screen 130, and accordingly, the lightweight foreign substances 2 are transferred in the rotating direction of the screening drum 100, in a state of being attached to the sorting screen 130, and then discharged in the section where the sucking force is not provided.

As shown in FIG. 2, the hood 170 provides the sucking force to the conveyor belt 10 over the entire U-shaped section of the conveyor belt 10, and as the screening drum 100 rotates, the lightweight foreign substances 2 attached to the sorting screen 130 are transferred in the rotating direction of the screening drum 100 in the state of being attached to the sorting screen 130 by means of the sucking force provided to the hood 170. After that, if the lightweight foreign substances 2 reach the section where the sucking force is not provided, they are separated from the sorting screen 130 and thus discharged to the outside. In this case, the lightweight foreign substances 2 may be still attached to the sorting screen 130 owing to the remaining sucking force or static electricity, without escaping from the sorting screen 130. According to the present invention, however, because the screening drum 100 rotates consistently, the lightweight foreign substances 2 are easily discharged by means of the centrifugal force generated by the rotation of the screening drum 100. Further, if the lightweight foreign substances 2 freely drop, they may not be put into a foreign substance discharge hole (not shown) accurately, but according to the present invention, the lightweight foreign substances 2 scatter by a given height when they are discharged by means of the centrifugal force generated by the rotation of the screening drum 100, so that they are accurately put in the foreign substance discharge hole and thus discharged to the outside more stably.

As shown in FIG. 2, the hood 170 has an extension portion extending by a given length from the underside thereof in the discharging direction of the lightweight foreign substances 2. In the case of there is a need to lift the lightweight foreign substances 2 to a given height and thus induce them to the discharge hole stably, the underside of the hood 170 extends by the given length to allow the sucking force to be applied extendingly. Further, if the hood 170 reaches the discharge section of the lightweight foreign substances 2, the extension portion of the hood 170 becomes decreased gradually in the sucking force as the hood 170 reaches the discharge section, so that the lightweight foreign substances 2 are easily discharged.

Further, the return prevention screens 160 are equally spaced apart from one another on the outer peripheral surface of the sorting screen 130, and in this case, tops of the return prevention screens 160 are located on the sorting screen 130 in the axial direction and undersides thereof do not come into contact with the conveyor belt 10. In this case, tops of the return prevention screens 160, which are connected to the sorting screen 130, are rotatably coupled to the sorting screen 130 with respect to axial connection portions, so that as they rotate, they can help the lightweight foreign substances 2 sorted.

The return prevention screens 160 may have the same material and structure as the sorting screen 130. Further, the edges of the return prevention screens 160 are reinforced with iron frames or made of a flexible material.

As the return prevention screens 160 are additionally provided, they prevent the lightweight foreign substances 2 from scattering randomly to the outside of the screening drum 100 owing to the sucking force, and as they rotate by means of the centrifugal force, inertia, and gravity, they help the lightweight foreign substances 2 scatter and thus discharged to an appropriate drop position. Further, the return prevention screens 160 prevent the lightweight foreign substances 2 from being returned and re-attached to the sorting screen 130 because of the static electricity, while the lightweight foreign substances 2 are being discharged.

Figure 3:
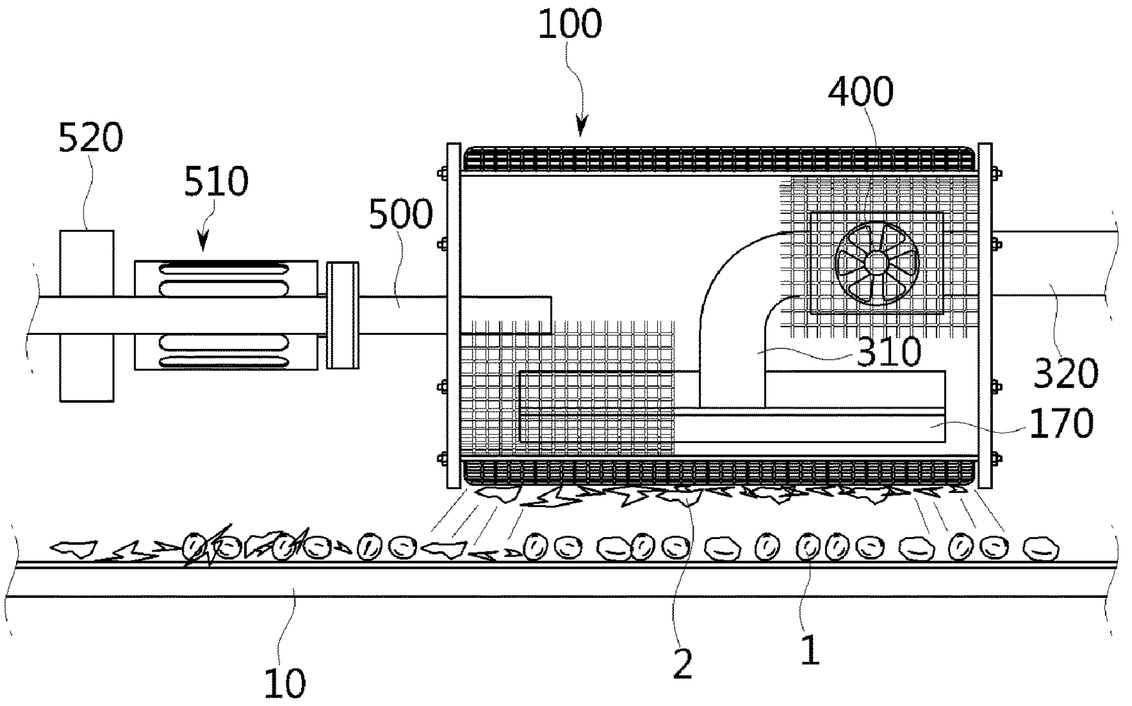
FIG. 3 is an exemplary view showing a state where a suction fan is disposed inside the screening drum of the device according to the present invention.
Figure 4:
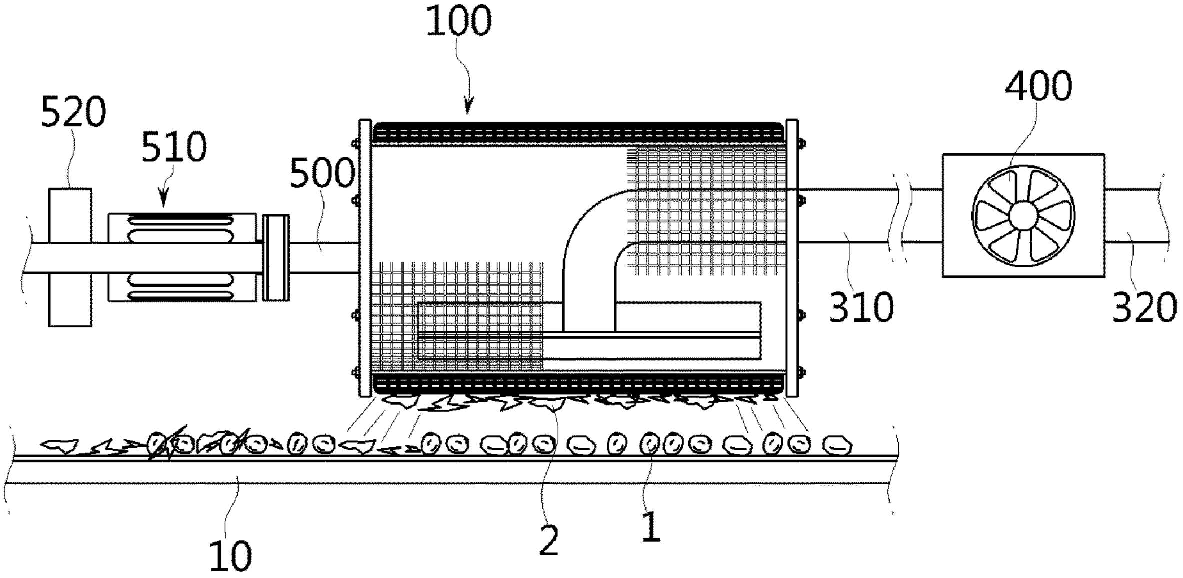
FIG. 4 is an exemplary view showing a state where the suction fan is disposed outside the screening drum of the device according to the present invention.

Further, as shown in FIGS. 3 and 4, the suction fan 400 may be disposed inside or outside the screening drum 100. FIG. 3 shows a state where the suction fan 400 is disposed inside the screening drum 100, and FIG. 4 shows a state where the suction fan 400 is disposed outside the screening drum 100. The screening drum 100 is easily changed in size, and accordingly, if the accommodation space in the interior of the screening drum 100 is sufficient, the suction fan 400 as well as the hood 170 may be disposed inside the screening drum 100.

If it is hard to locate the suction fan 400 inside the screening drum 100, the suction fan 400 is disposed outside the screening drum 100 and transfers the sucking force to the hood 170 through the suction pipe 310. In this case, the suction pipe 310 is inserted into the open hole of the second side plate 120 and thus communicates with the interior of the screening drum 100.

Contrarily, if the suction fan 400 is disposed inside the screening drum 100, the suction pipe 310 is located inside the screening drum 100, and the discharge pipe 320 communicates with the interior of the screening drum 100 through the open hole of the second side plate 120.

In this case, the suction pipe 310 or the discharge pipe 320, which is inserted into the open hole of the second side plate 320 from the outside of the screening drum 100, is located to allow its underside thereof to be supported against an auxiliary frame, thereby being prevented from being sagged because of long-term use.

According to the present invention, the drum-type foreign substance suctional attaching and screening device further includes auxiliary wheels 600 adapted to support the load of the screening drum 100, and the auxiliary wheels 600 come into contact with the outer peripheral surface of the second side plate 120 and thus interlockingly rotate with the second side plate 120.

As mentioned above, the screening drum 100 is located in the air, to the form of the cantilever, in the state where the rotary shaft 500 is coupled to the first side plate 110, and accordingly, the auxiliary wheels 600 are located under the second side plate 120 disposed on the opposite side to the coupled portion between the rotary shaft 500 and the screening drum 100 to thus distribute the load of the screening drum 100.

As shown in FIG. 2, the auxiliary wheels 600 are located on front and rear sides of the lower periphery of the second side plate 120. In this case, when the rotary center of the screening drum 500 and the centers of both side auxiliary wheels 600 are connected to one another, a triangular shape is made, and accordingly, the load of the screening drum 100 can be stably distributed.

The auxiliary wheels 600 may have rotatable structures interlockingly rotating with the second side plate 120, such as rollers, gears, sprockets, and the like.

Figure 5:
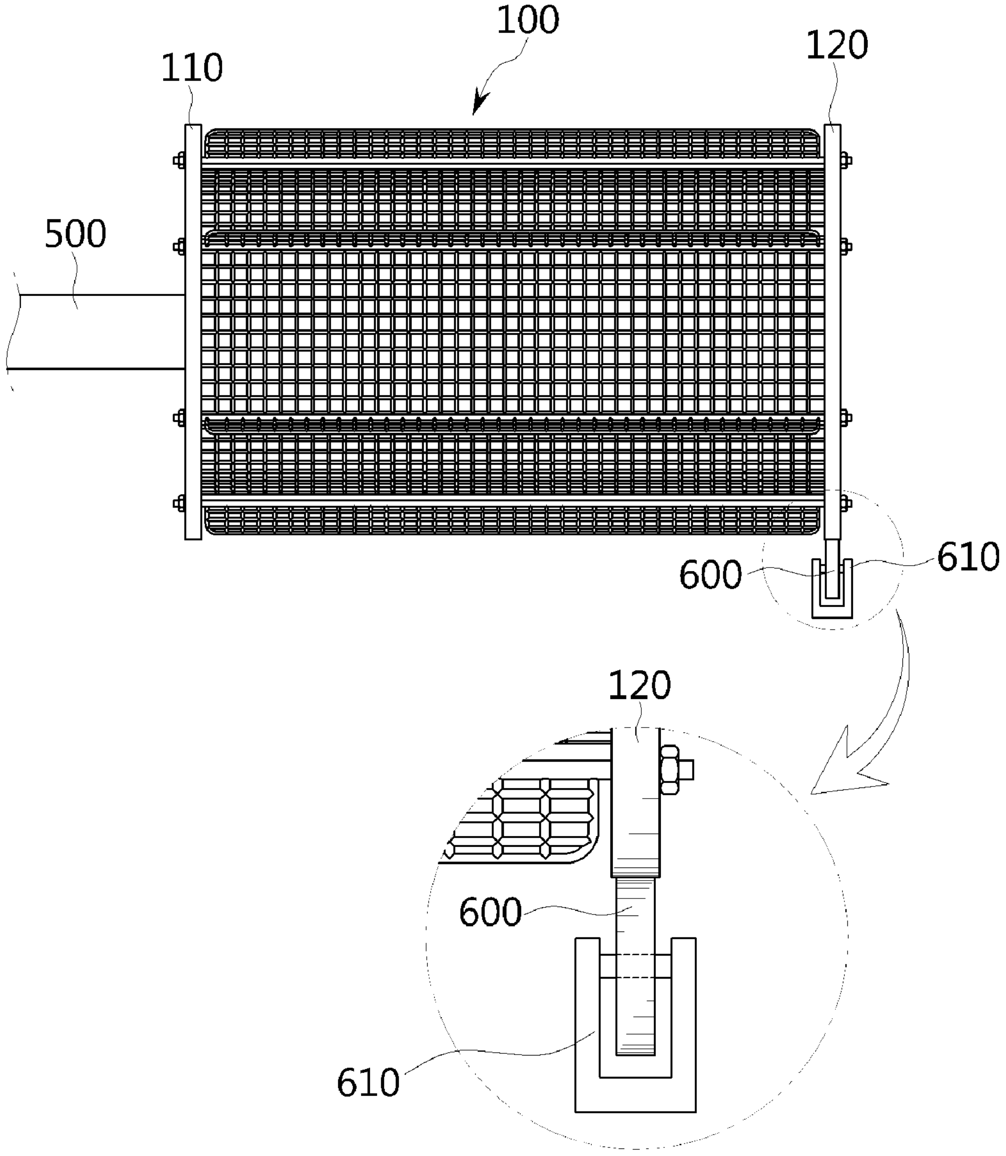
FIG. 5 is a side view showing roller type auxiliary wheels interlockingly rotating with a second side plate of the device according to the present invention.

FIG. 5 shows roller type auxiliary wheels 600, and the roller type auxiliary wheels 600 come into contact with the ring-shaped second side plate 120 and thus rotate.

Figure 6:
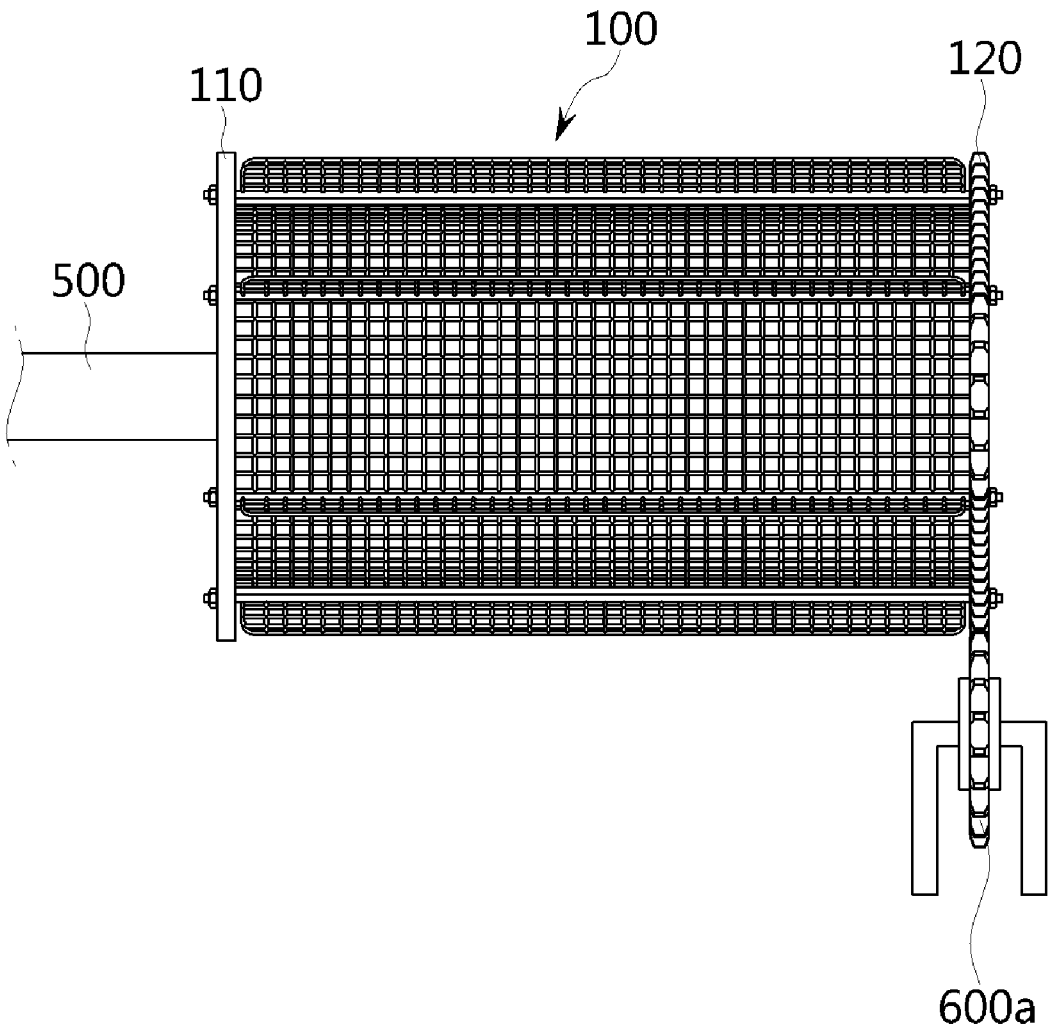
Figure 7:
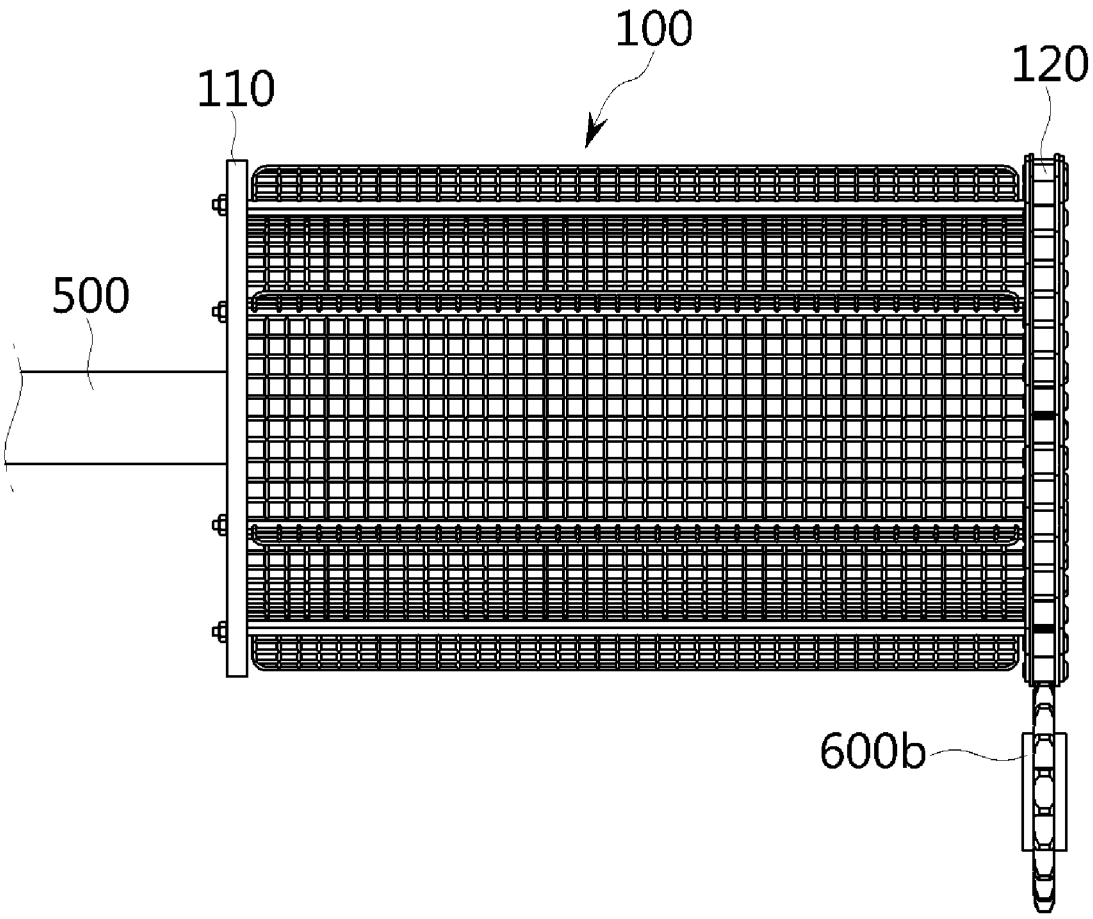
Figure 8:
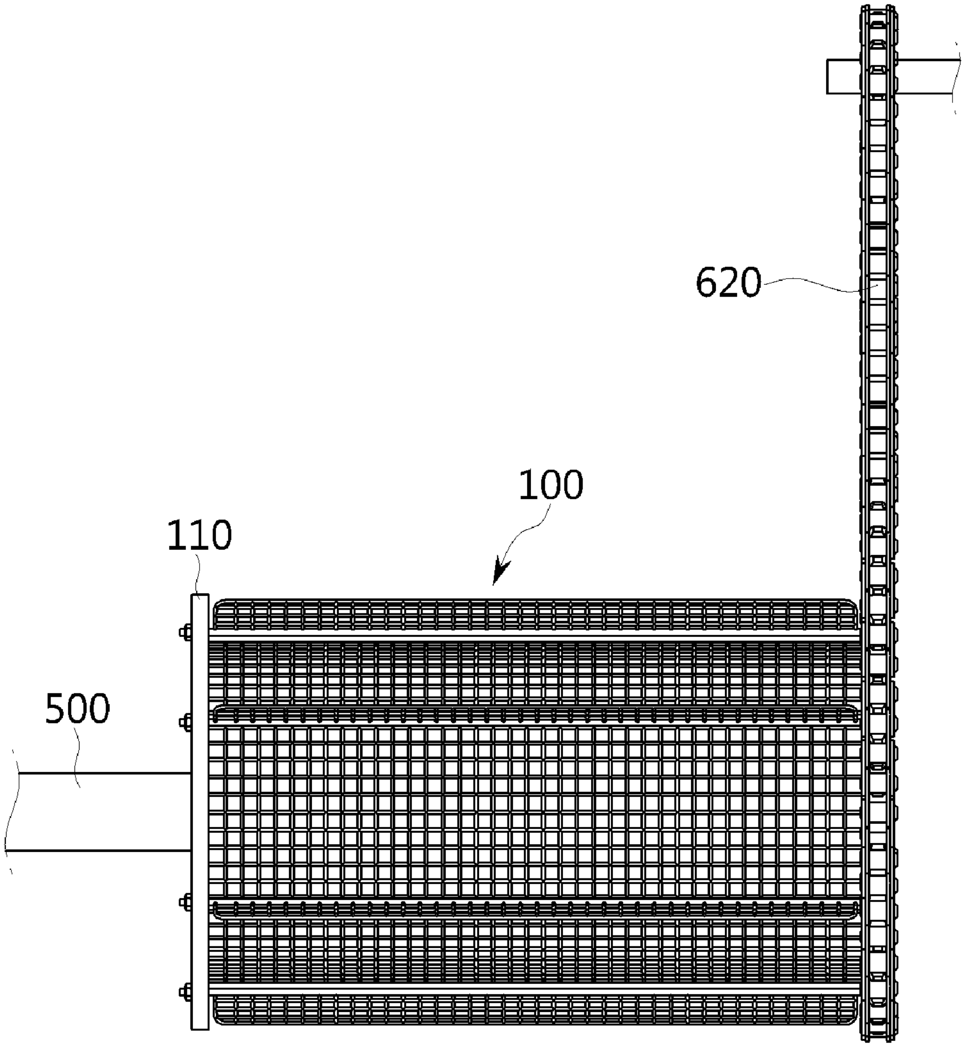

FIGS. 6 to 8 show other examples of the auxiliary wheels 600. In specific, FIG. 6 shows a state where auxiliary gears **600*a* are mounted as the auxiliary wheels 600, FIG. 7 shows a state where auxiliary sprockets 600*b* as the auxiliary wheels 600, and FIG. 8 shows a state where chains 620 as the auxiliary wheels 600**.

FIG. 6 shows a gear type rotating structure. In this case, gear teeth are formed on the outer peripheral surface of the second side plate 120, and the auxiliary gears 600*a* interlockingly rotate with the gear teeth of the second side plate 120. As a result, the auxiliary gears 600*a* serve to distribute the load of the screening drum 100, like the roller type auxiliary wheels 600.

FIG. 7 shows a chain sprocket rotating structure. In this case, a chain 620 is surroundingly located on the outer peripheral surface of the second side plate 120, and the auxiliary sprockets 600*b* interlockingly rotate with the chain 620. As a result, the auxiliary sprockets 600*b* serve to distribute the load of the screening drum 100, like the roller type auxiliary wheels 600.

FIG. 8 shows another chain sprocket rotating structure. In this case, a sprocket is surroundingly located on the outer peripheral surface of the second side plate 120, and a sprocket, which is spaced apart from top of the screening drum 100, interlockingly rotates with the sprocket located on the second side plate 120 by means of the chain 620. As a result, the second side plate 120 of the screening drum 100 is connected to the sprocket located above the screening drum 100 by means of the chain 620, so that the screening drum 100 is prevented from being sagged and the load of the screening drum 100 is distributed.

Further, the device according to the present invention includes a channel type cover 610 adapted to surround the corresponding auxiliary wheel 600. As shown in FIG. 5, the channel type cover 610 surroundingly protects the corresponding auxiliary wheel 600 and fixes a rotary shaft of the auxiliary wheel 600 thereto.

The auxiliary wheels 600 are not coupled to separate auxiliary power transmitters but interlockingly rotate with the screening drum 100 so that they serve only to distribute the load of the screening drum 100.

Otherwise, the device according to the present invention further includes the auxiliary power transmitters (not shown) connected to the center shafts of the auxiliary wheels 600 to rotate the auxiliary wheels 600. In this case, the auxiliary power transmitters operate to control the rotating speeds of the auxiliary wheels 600 in accordance with the rotation ratios so as to allow the auxiliary wheels 600 to interlockingly rotate with the second side plate 120 gently. As mentioned above, if the auxiliary power transmitters are coupled to the auxiliary wheels 600, the load of the power transmitter 510 connected to the rotary shaft 500 can be distributed.

Further, the sorting screen 130 is formed by coupling sorting screen modules 131 each defined to a given size to one another.

Figure 9:
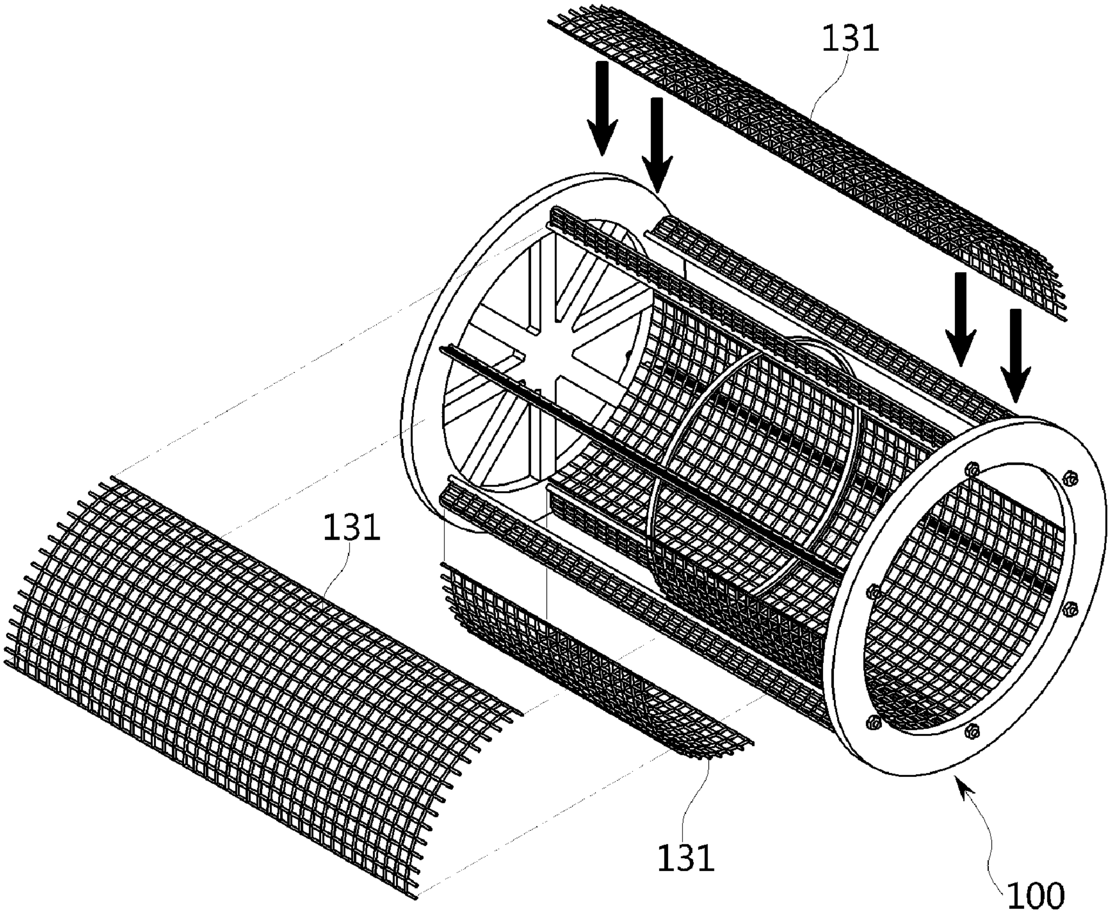
FIG. 9 is a perspective view showing a state where the sorting screen is detachably mounted, to the form of sorting screen modules, on the screening drum of the device according to the present invention.

FIG. 9 shows a state where the sorting screen 130 is detachably mounted to the form of the sorting screen modules 131.

The sorting screen 130 is formed by coupling the sorting screen modules 131 each defined to the given size to one another, and the sizes of the modules are determined according to the space sizes formed between the neighboring connection frames 140.

Referring to FIG. 9, the coupling structure of the sorting screen modules 131 will be explained. The screening drum 100 includes the first and second side plates 110 and 120 and the connection frames 140 connecting the first and second side plates 110 and 120 to each other and supporting the sorting screen 130, and further, the screening drum 100 includes a ring-shaped frame 150 disposed surroundingly on the intermediate portions of the connection frames 140 to reinforce the strength of the connection frames 140.

As shown in FIG. 9, the outer peripheral surface of the screening drum 100 is divided into eight compartments defined by the first and second side plates 110 and 120, the connection frames 140, and the ring-shaped frame 150, and accordingly, the sorting screen modules 131 are made in accordance with the sizes and shapes of the respective compartments and thus coupled to the connection frames 140 and the ring-shaped frame 150. Otherwise, the sorting screen modules 131 may be made to the sizes corresponding to the sizes of two or more compartments, so that one sorting screen module 131 may be coupled to the two or more compartments.

If the sorting screen 130 is provided to the form of the sorting screen modules 131 coupled to one another, the entire sorting screen 130 is not replaced by new one when a portion of the sorting screen 130 is damaged or broken. Accordingly, only the damaged or broken sorting screen module 131 is replaced by new one rapidly, thereby reducing labor and repair costs and ensuring easy maintenance.

Figure 10:
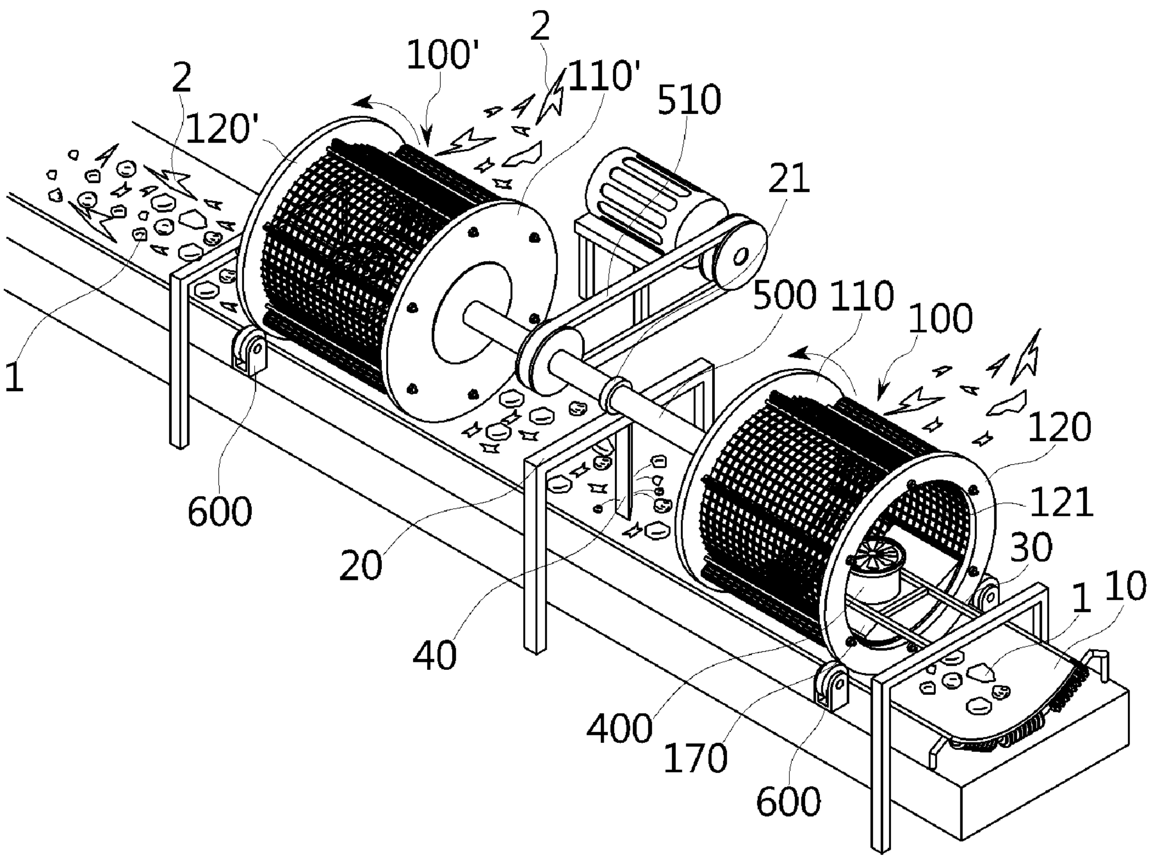
FIG. 10 is a perspective view showing an example in which a pair of screening drums is provided in the device according to the present invention.
Figure 11:
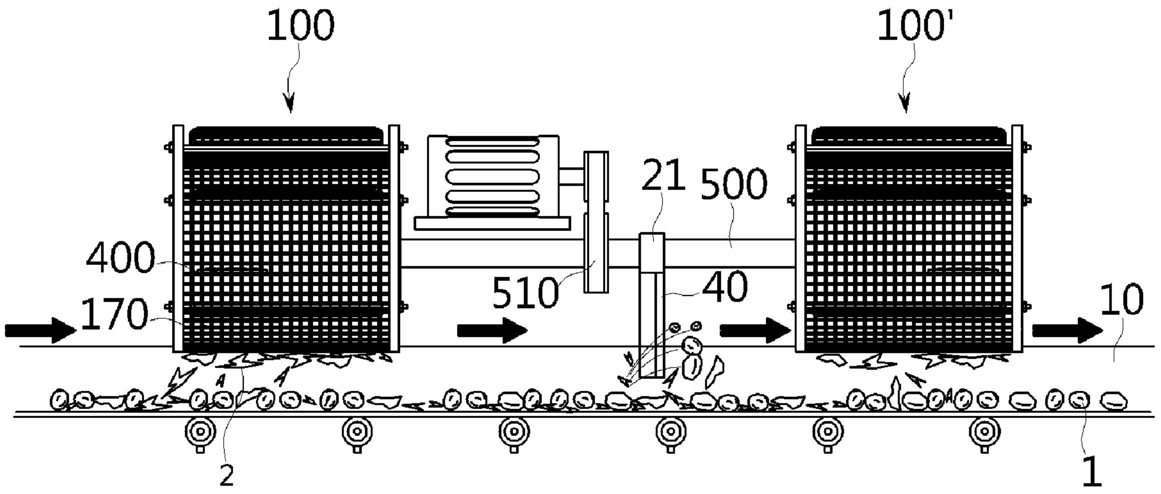
FIG. 11 is a side view showing states of aggregates and foreign substances when the aggregates pass through the pair of screening drums and reverse rotating members disposed between the pair of screening drums sequentially in the device according to the present invention.

As shown in FIGS. 10 and 11, a drum-type foreign substance suctional attaching and screening device according to another embodiment of the present invention is configured to have a pair of screening drums 100 and 100' spaced apart from each other by a given distance and having first side plates 110 and 110' facing each other, hoods 170 disposed inside the pair of screening drums 100 and 100', and a rotary shaft 500 coupled to the centers of the first side plates 110 and 110' of the pair of screening drums 100 and 100' and thus rotating with the power received from the outside.

Like this, if the pair of screening drums 100 and 100' is coupled to both ends of the rotary shaft 500, the screening drums 100 and 100' having the same weight as each other are located on both ends of the rotary shaft 500, so that both side weights are the same as each other around the intermediate portion of the rotary shaft 500 to prevent the pair of screening drums 100 and 100' from being inclined or sagged toward any one side thereof. Accordingly, the load of the pair of screening drums 100 and 100' is distributed equally to both sides of the rotary shaft 500, thereby needing no additional member for distributing the load of the screen drum, such as a counter weight.

Further, the drum-type foreign substance suctional attaching and screening device according to the present invention includes a support frame 20 for supporting the rotary shaft 500. As the pair of screening drums 100 and 100' is supportedly coupled to the rotary shaft 500, the load of the pair of screening drums 100 and 100' is supported against the rotary shaft 500, and the pair of screening drums 100 and 100' whose first side plates 110 and 110' are connected to the rotary shaft 500 is coupled to the rotary shaft 500 to the form of a cantilever.

As shown in FIGS. 10 and 11, the support frame 20 is located on the intermediate portion of the rotary shaft 500 to support the rotary shaft 500 thereagainst. If the support frame 20 is located on the intermediate portion of the rotary shaft 500, the load of the pair of screening drums 100 and 100' is distributed equally to both sides of the rotary shaft 500 around the support frame 20.

Figure 13:
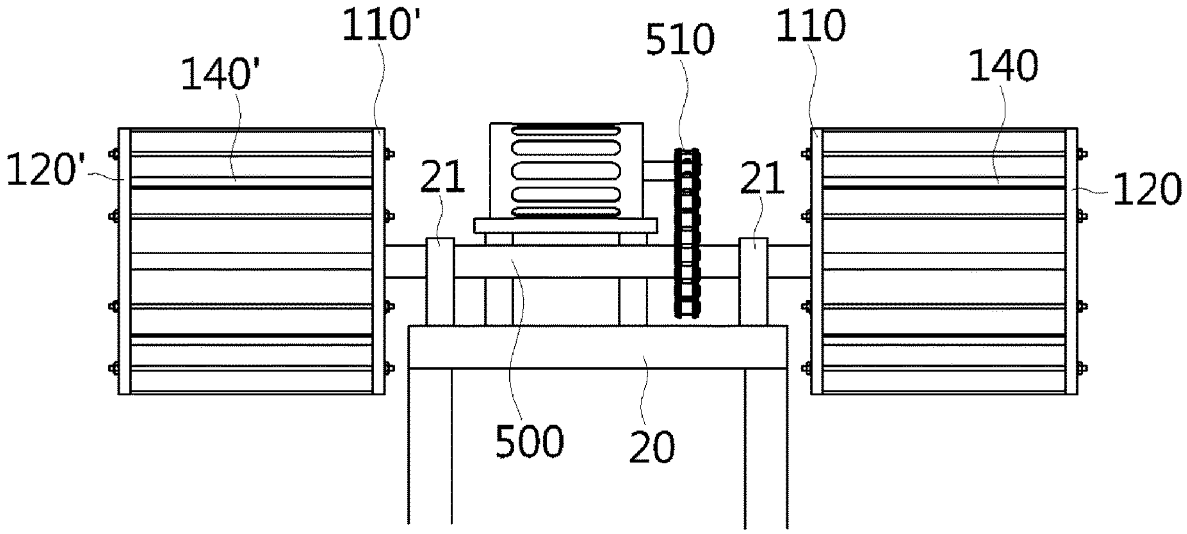
FIG. 13 is a side view showing a state where a rotary shaft for connecting the pair of screening drums is supported against a support frame in the device according to the present invention.

Further, as shown in FIG. 13, the support frame 20 has the shape of a polyhedron such as ㅂ, ㄷ, or the like so as to support the rotary shaft 500 in an axial direction of the rotary shaft 500.

In this case, the support frame 20 includes bearing housings 21 disposed on top thereof to pass the rotary shaft 500 therethrough.

The bearing housings 21 are configured to allow bearings mounted therein to be stably kept to rotate the rotary shaft 500 gently and support the load of the rotary shaft 500. The bearings come into contact with the outer peripheral surface of the rotary shaft 500 to reduce the frictional force against the rotary shaft 500 and support the load applied to the rotary shaft 500.

One or more bearing housings 21 may be located on top of the support frame 20 according to the load applied to the rotary shaft 500.

As shown in FIG. 13, if the bearing housings 21 are located on both sides of the support frame 20, desirably, they prevent the rotary shaft 500 from being sagged or bent to stably support both sides of the rotary shaft 500.

Further, a power transmitter 510 is provided to transfer the power received from the outside to the rotary shaft 500. The rotary shaft 500 receives a rotary force from the power transmitter 510 and thus rotates the pair of screening drums 100 and 100' simultaneously.

The power transmitter 510 is configured to transfer the rotary force generated from a rotary motor to the rotary shaft 500 by means of a chain, a belt, a gear, and the like.

As shown in FIG. 13, the chain type power transmitter 510 includes a power transmission sprocket fitted to the outer peripheral surface of the rotary shaft 500 and a power transmission chain for transferring the rotary force received from the outside.

As shown in FIGS. 10 and 11, the belt type power transmitter 510 includes a pulley fitted to the outer peripheral surface of the rotary shaft 500 and a power transmission belt. So as to prevent the power transmission belt from slipping from the pulley, in this case, frictional forces on the contacted surfaces between the pulley and the power transmission belt have to be improved, and to do this, otherwise, grooves may be formed on the contacted surfaces.

The gear type power transmitter 510 includes gear teeth formed on the outer peripheral surface of the rotary shaft 500 and a gear for transferring the rotary force received from the outside.

The power transmitter 510 may be disposed on any position of the rotary shaft 500 in the axial direction of the rotary shaft 500.

Like this, the device according to the present invention can rotate the pair of screening drums 100 and 100' simultaneously through the single power transmitter 510.

Figure 12:
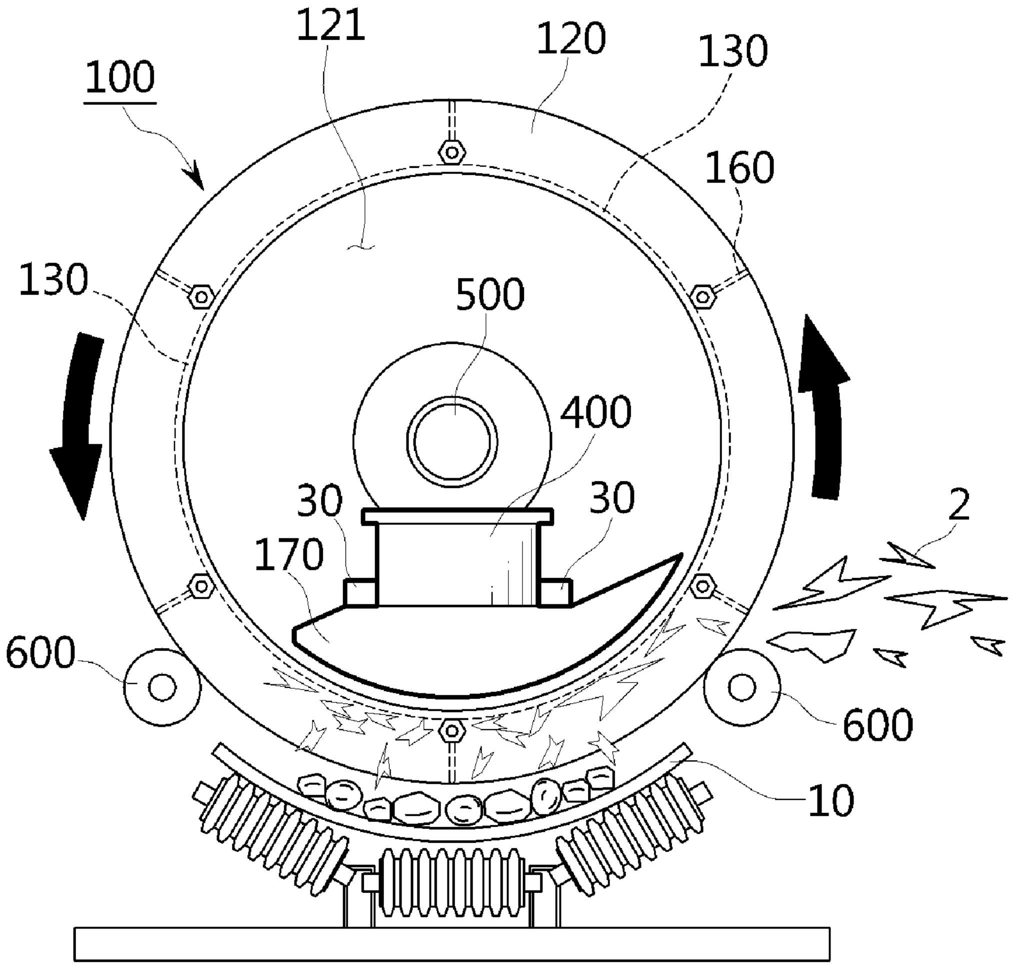
FIG. 12 is a concept view showing a process where foreign substances are discharged in a section where a sucking force is not provided, while moving in a state of being attached to the sorting screen of the screening drum of the device according to the present invention.

As shown in FIGS. 10 to 12, the suction fans 400 are directly connected to the hoods 170 and thus located inside the corresponding screening drums 100 and 100'.

Further, the device according to the present invention further include cantilever arms 30 adapted to support each hood 170, and each cantilever arm 30 has one end fixed to the outside of the corresponding screening drum 100 and the other end inserted into the corresponding screening drum 100 through an open hole 121 of the second side plate 120.

Like this, if the suction fan 400 and the hood 170 are directly connected to each other, there is no need to install a separate channel for discharging the air sucked by the suction fan 400, so that the sucked air is discharged from the interior of the screening drum 100, thereby removing the interference with other equipment because of the formation of the channel and allowing the number of screening drums to be appropriately determined in accordance with desired places in the construction waste intermediate treatment facility. In this case, the sucked air is discharged through the sorting screen 130 or the open hole 121.

The hood 170 is spaced apart from the inner peripheral surface of the corresponding screening drum 100, while being located in the air. To do this, one end of the cantilever arms 30 is fixed to the outside of the corresponding screening drum 100, and the other end thereof is inserted into the corresponding screening drum 100 through the open hole 121 of the second side plate 120, so that the cantilever arms 30 serve to support the hood 170.

To stably support the load of the hood 170, one end of the cantilever arms 30 is fixed to a stable structure with high durability, such as a fixed frame, a post, a wall, and the like.

Further, a drum-type foreign substance suctional attaching and screening device according to yet another embodiment of the present invention includes a magnetic attaching drum 200 configured to have circular type first and second side plates 210 and 220 located on both sides thereof, sorting films 230 surrounding the space between the first and second side plates 210 and 220, and a magnetic force sorter 240 mounted therein to provide a magnetic force so that the magnetic attaching drum 200 sorts iron foreign substances 3 by means of the magnetic force, a screening drum 100 located spaced apart from the magnetic attaching drum 200 by a given distance to allow a first side plate 110 to face the first side plate 210 of the magnetic attaching drum 200, and a rotary shaft 500 coupled to the centers of the first side plates 110 and 210 of the screening drum 100 and the magnetic attaching drum 200 and thus rotating with the power received from the outside, wherein the magnetic force generated from the magnetic force sorter 240 of the magnetic attaching drum 200 is applied to the iron foreign substances 3 transferred along a conveyor belt 10 from the sorting films 230, and the iron foreign substances 3 are transferred in the rotating direction of the magnetic attaching drum 200 in a state of being attached to the sorting films 230 and thus discharged in a section where the magnetic force is not provided, so that the iron and lightweight foreign substances 3 and 2 contained in the aggregates transferred along the conveyor belt 10 in one direction are sorted sequentially.

Figure 14:
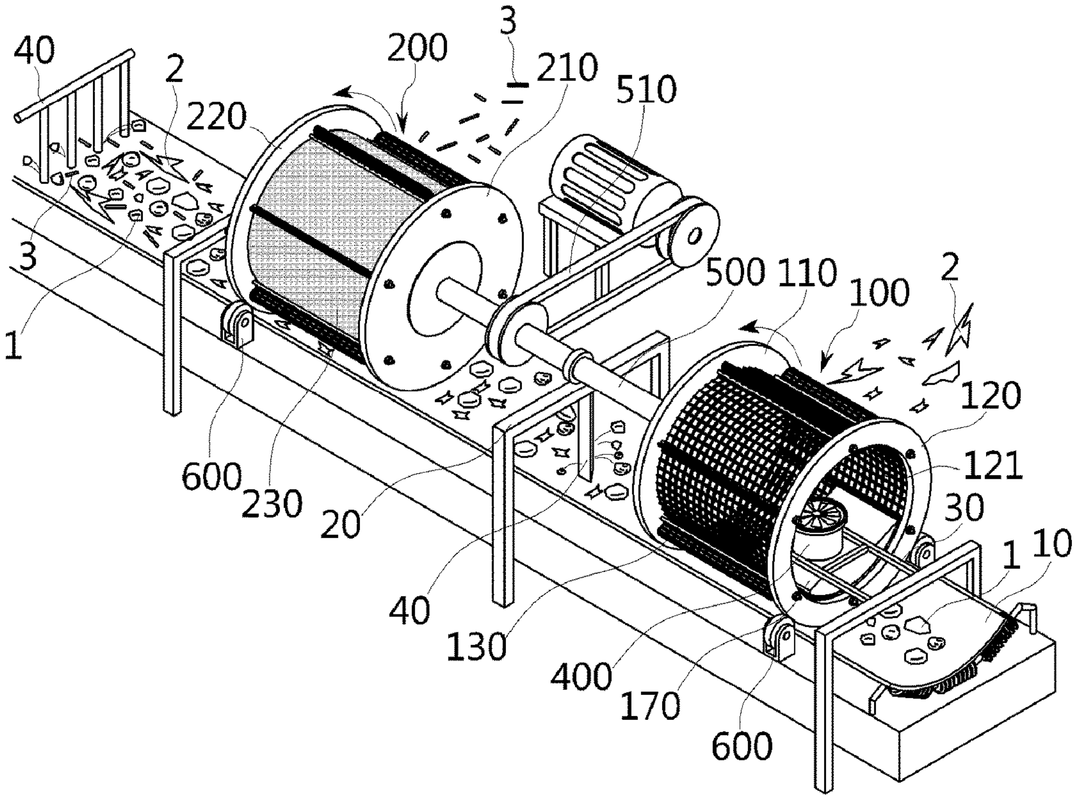
FIG. 14 is a perspective view showing another example where one screening drum and one magnetic attaching drum are provided in the device according to the present invention.
Figure 15:
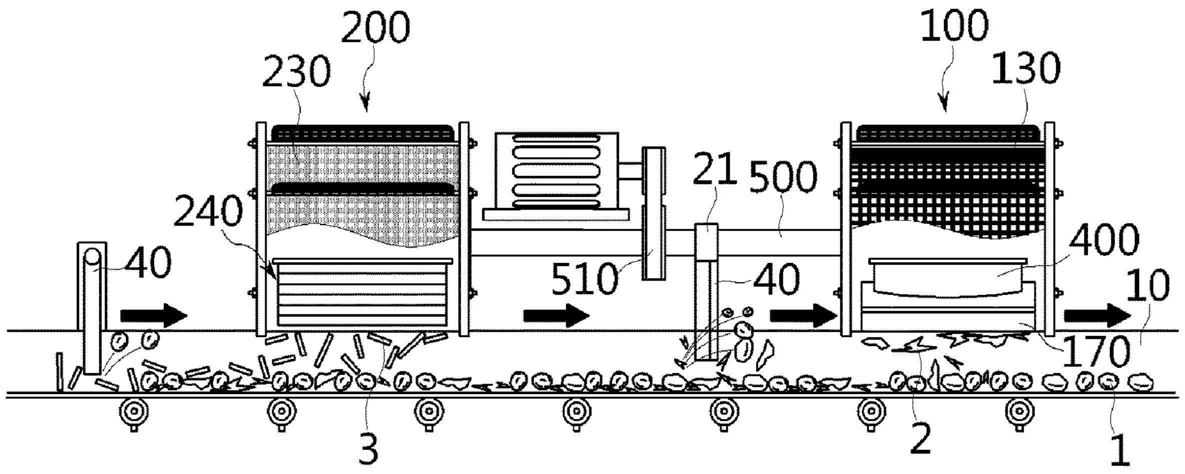
FIG. 15 is a side view showing a process of sorting iron foreign substances and lightweight foreign substances when aggregates pass through the magnetic attaching drum and the screening drum sequentially in the device according to the present invention.

As shown in FIGS. 14 and 15, the drum-type foreign substance suctional attaching and screening device according to the present invention is configured so that the screening drum 100 is coupled to one side end of the rotary shaft 500 and the magnetic attaching drum 200 to the other side end of the rotary shaft 500.

Figure 16:
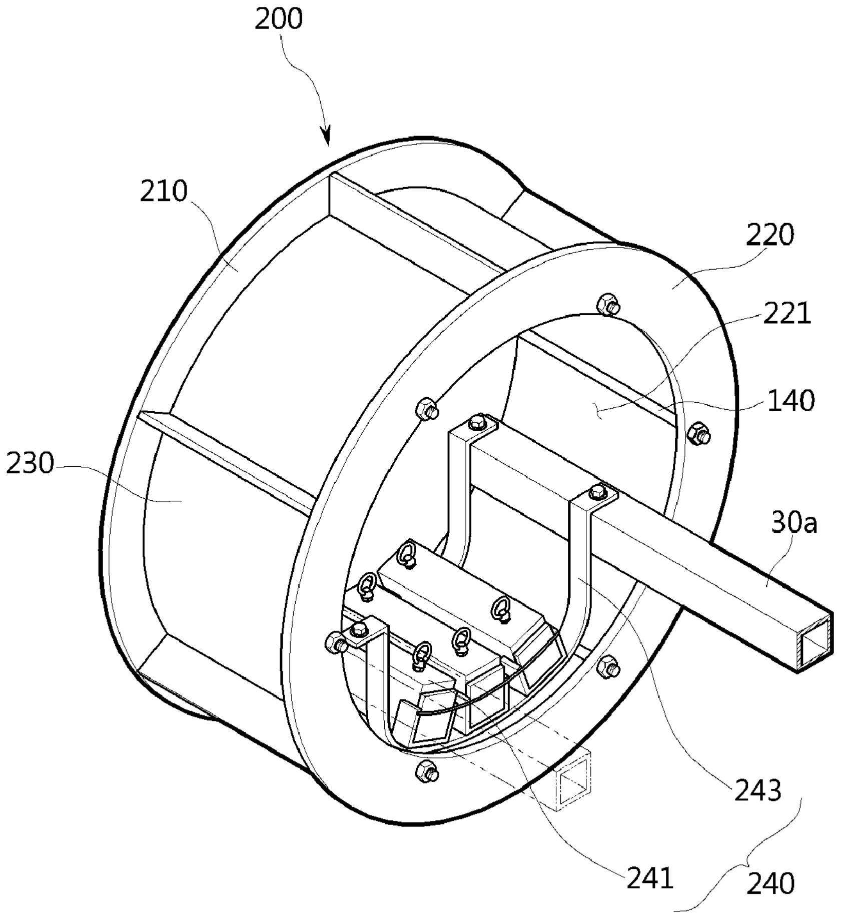
FIG. 16 is a perspective view showing the magnetic attaching drum according to the present invention.

As shown in FIG. 16, the magnetic attaching drum 200 is a drum type member that includes circular type first and second side plates 210 and 220 located on both sides thereof and the sorting films 230 surrounding the space between the first and second side plates 210 and 220, so that an internal space is provided.

The sorting films 230 may be made of any one or more materials selected from rubber, synthetic resin, synthetic fiber, metal, and the like.

The sorting films 230 come into direct contact with the iron foreign substances 3, and to prevent the sorting films 230 from being worn or broken by the iron foreign substances 3, accordingly, the sorting films 230 are desirably made of a non-magnetized material with given stiffness. Further, as the outer peripheral surface of the magnetic attaching drum 200 is formed of the sorting films 230, the sorting films 230 are made of a material machinable to the shape of an arch. Desirably, the sorting films 230 are made of alloy steel or austenite type stainless steel that has given strength and no influence by magnetism and is moldable to the shape of the arch.

Further, the sorting films 230 are curved plate members having a given thickness that are coupled to the first and second side plates 210 and 220 on both side ends thereof, thereby having the entire shape of a ring. Desirably, the sorting films 230 have a relatively low thickness so that they can pass the magnetic force therethrough, while minimizing the loss of the magnetic force and satisfying the given strength.

Further, support members (not shown) may be located on the inner surfaces or edges of the sorting films 230 to support the sorting films 230 thereagainst.

The support members are freely arranged to the form of a lattice, a diagonal line, a laminated layer, and the like, but so as to keep the shapes of the sorting films 230 stably, the support members are regularly arranged at given intervals to prevent the sorting films 230 from being deformed or twisted.

The support members are desirably made of a metal material with good stiffness, while having no influence by the magnetic force, such as austenite type stainless steel. Further, in the case where the support members are continuously arranged in the form of the lattice or line, desirably, they have maximum distances from one another so that they can pass the magnetic force therethrough, without having any interference.

The magnetic force sorter 240 is configured to have a plurality of magnetic members 241 spaced apart from the sorting films 230 in a lower portion of the inner space of the magnetic attaching drum 200 and each having a plurality of permanent magnets 242 laminated on top of one another, so that the magnetic force sorter 240 applies the magnetic forces generated from the magnetic members 241 in a downward direction.

The undersides of the magnetic members 241 of the magnetic force sorter 240 are located close and parallel to the tangent lines of the lower side sorting films 230 of the magnetic attaching drum 200. The underside of the magnetic attaching drum 200 has the shape of the arch corresponding to the U-shaped conveyor belt 10, and the magnetic members 241 are located close and parallel to the tangent lines of the lower side sorting films 230 of the magnetic attaching drum 200, so that the undersides of the magnetic members 241 are kept to a given distance from the lower side sorting films 230 of the magnetic attaching drum 200, thereby allowing the magnetic forces to be applied equally to top of the conveyor belt 10.

One or more magnetic members 241 are provided for the magnetic force sorter 240. If the single magnetic member 241 does not transfer the magnetic force sufficiently, the plurality of magnetic members 241 is arranged. That is, the number of magnetic members 241 is appropriately adjusted according to the size of the magnetic attaching drum 200, and accordingly, the plurality of magnetic members 241 is arranged before a discharge section of the iron foreign substances 3, so that the iron foreign substances 3 can be stably transferred to the discharge section.

Further, the magnetic force sorter 240 is configured to allow the plurality of magnetic members 241 to be arranged radially at equal angles on the center points of the first and second side plates 210 and 220, while the undersides of the magnetic members 241 are being located close and parallel to the tangent lines of the sorting films 230.

Figure 17:
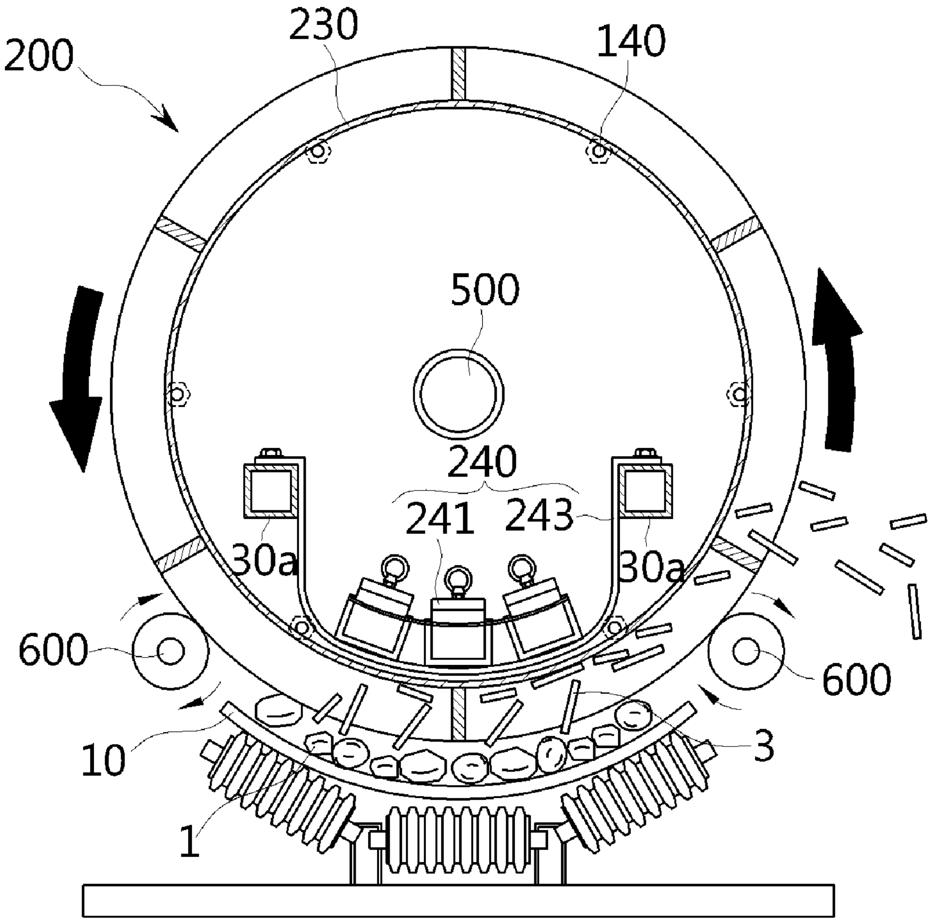
FIG. 17 is a front view showing a state where the iron foreign substances are sorted according to the rotation of the magnetic attaching drum.
Figure 18:
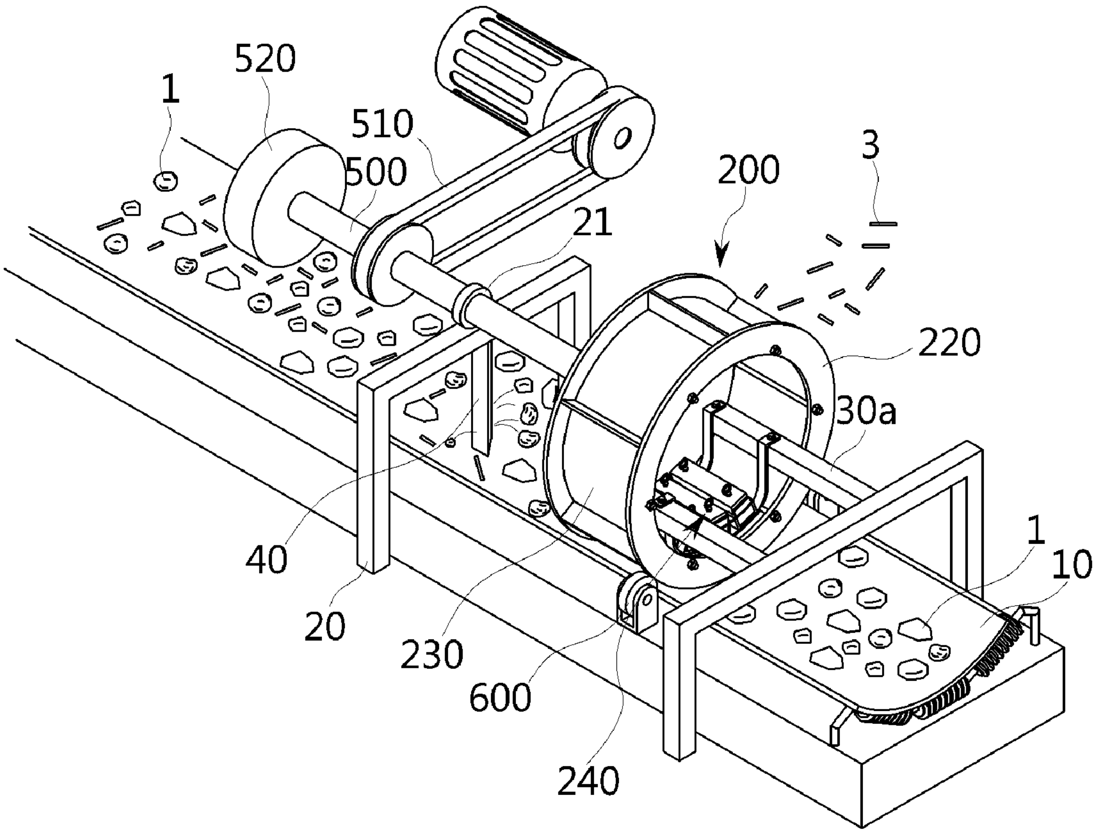
FIG. 18 is a perspective view showing yet another example where only a single magnetic attaching drum is provided in the device according to the present invention.
Figure 19:
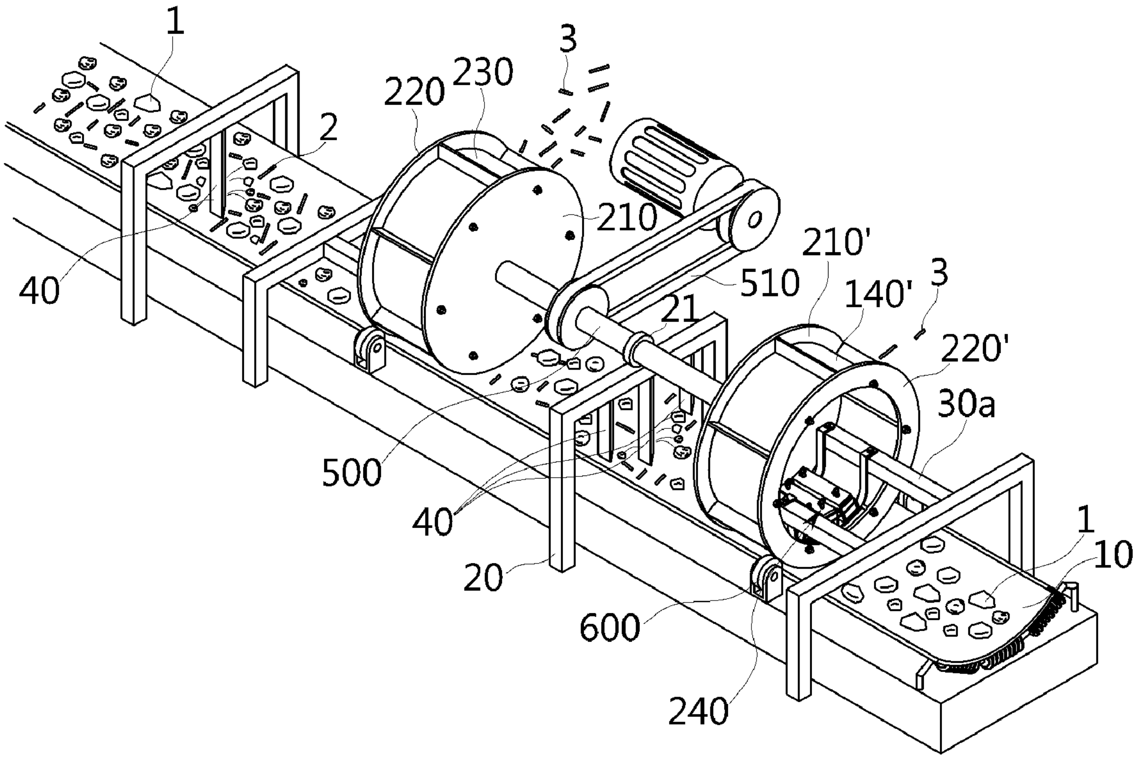
FIG. 19 is a perspective view showing still another example where a pair of magnetic attaching drums is provided in the device according to the present invention.
Figure 20:
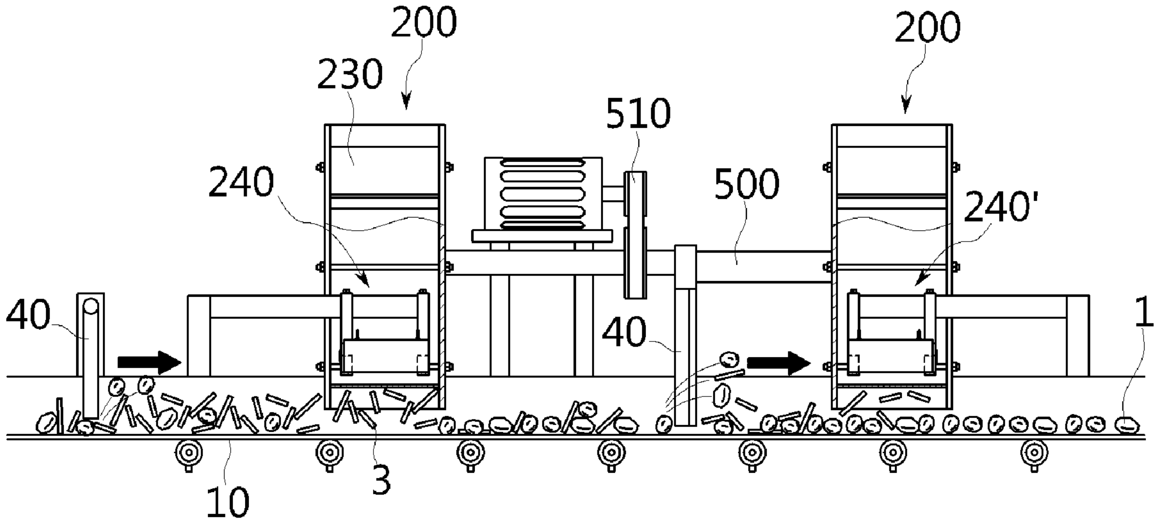
FIG. 20 is a side view showing a process of sorting iron foreign substances when circled aggregates pass through one pair of magnetic attaching drums sequentially.

As shown in FIG. 17, the magnetic force sorter 240 is configured to allow the plurality of magnetic members 241 to be arranged radially at equal angles on the center points of the first and second side plates 210 and 220, while the undersides of the magnetic members 241 are being located close and parallel to the tangent lines of the lower side sorting films 230 of the magnetic attaching drum 200, so that the magnetic force sorter 240 can apply the magnetic forces to top of the conveyor belt 10 equally.

In summary, the magnetic force sorter 240 provides the magnetic forces equally in the downward direction, especially in the form of the arch corresponding to the underside shape of the magnetic attaching drum 200, so that it can apply the magnetic forces to top of the conveyor belt 10 with the U-shaped section equally.

The device according to the present invention further includes cantilever arms 30*a* each having one end fixed to the outside of the magnetic attaching drum 200 and the other end inserted into the magnetic attaching drum 200 through an open hole 221 of the second side plate 220, and the magnetic force sorter 240 includes fixing brackets 243 disposed on the cantilever arms 30*a* to fix the cantilever arms 30*a* thereto and a plurality of cases 244 spaced apart from the sorting films 230 by means of the fixing brackets 243 and accommodating the magnetic members 241 therein.

The magnetic force sorter 240 is spaced apart from the sorting films 230 in the internal space of the magnetic attaching drum 200, while being located in the air. Accordingly, the magnetic force sorter 240 is fixedly kept in the internal space of the magnetic attaching drum 200 stably, irrespective of the rotation of the magnetic attaching drum 200, by means of the cantilever arms 30*a*.

So as to stably support the load of the magnetic force sorter 240, one end of each cantilever arm 30*a* is fixed to a stable structure with high durability, such as a fixed frame, a post, a wall, and the like.

Figure 21:
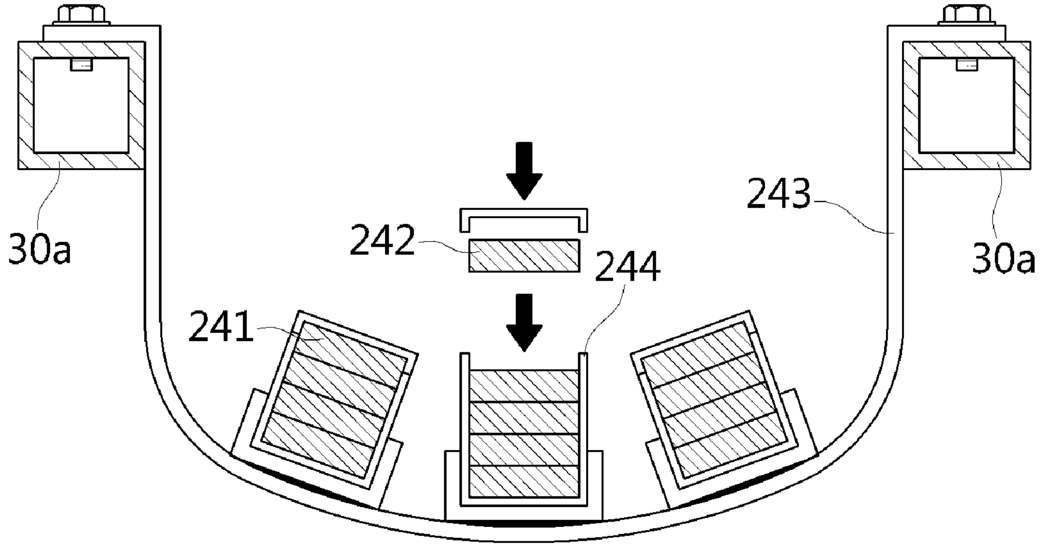
FIG. 21 is a sectional view showing a state where permanent magnets, which are laminated on top of one another, are accommodated into the cases of a magnetic force sorter.

As shown in FIGS. 17 and 21, each fixing bracket 243 has the underside with the shape of an arch corresponding to the underside of the magnetic attaching drum 200 and both sides as support rods fixed to the corresponding cantilever arm 30*a*.

The fixing brackets 243 accommodate the magnetic members 241 therein and have the shape of the arch, so that the undersides of the magnetic members 241 are located close and parallel to the tangent lines of the lower side sorting films 230 of the magnetic attaching drum 200.

As shown in FIGS. 16 and 17, each magnetic member 241 has a loop or handle disposed on top thereof so that it can be easily transferred to any place.

The cases 244 serve to accommodate the magnetic members 241 therein, and if each magnetic member 241 is configured to have the plurality of permanent magnets 242 laminated on tops of one another to the form of a block, each case 244 serves to stably accommodate the plurality of permanent magnets 242 therein.

The number of permanent magnets 242 laminated on tops of one another is proportional to the magnetic force. Accordingly, the number of permanent magnets 242 laminated on tops of one another inside each case 244 is adjusted according to the conditions of the magnetic force required, thereby controlling the strength of the magnetic force generated from the magnetic member 241.

For example, as shown in FIG. 21, the magnetic member 241 located in the middle of the plurality of magnetic members 241 has five permanent magnets 242 laminated on tops of one another, and both side magnetic members 241 each have four permanent magnets 242 laminated on tops of one another, so that the magnetic forces become relatively weak toward the sides of the magnetic force sorter 240, thereby appropriately controlling the strength of the magnetic forces.

Further, the device according to the present invention includes one or more reverse rotating members 40, as members extending up and down, each having a bottom end located close to top of the conveyor belt 10, and the reverse rotating members 40 are disposed perpendicular to top of the conveyor belt 10 so that as the conveyor belt 10 moves, the bottom ends of the reverse rotating members 40 collide against the aggregates 1 to allow the aggregates 1 to be reversely changed in position. The reverse rotating members 40 may be located at any position above the conveyor belt 10, but they may be fixedly located to the rotary shaft 500 or the support frame 20.

FIG. 11 is a concept view showing states of the aggregates 1 and the lightweight foreign substances 2 when the aggregates 1 pass through the pair of screening drums 100 and 100' and the reverse rotating members disposed between the pair of screening drums 100 and 100' sequentially. Further, FIG. 15 is a concept view showing a process of sorting the iron foreign substances 3 and the lightweight foreign substances 2 when the aggregates 1 pass through the magnetic attaching drum 200 and the screening drum 100 sequentially.

Hereinafter, a process of sorting the lightweight foreign substances 2 contained in the aggregates 1 will be explained in detail with reference to FIG. 11. Of course, the same process may be applied to the iron foreign substances 3. In explaining the process with reference to FIG. 11, the screening drum 100 of the pair of screening drums 100 and 100', which serves to primarily perform the sorting in the moving direction of the aggregates 1, is called the front side screening drum 100, and the screening drum 100', which serves to secondarily perform the sorting, is called the rear side screening drum 100'.

As shown in FIG. 11, while the aggregates 1 are passing through the front side screening drum 100, most of the lightweight foreign substances 2 are attached and thus sorted. In this case, the lightweight foreign substances 2, which are covered pressurizedly with the aggregates, may not be sorted even by the sucking force applied by the front side screening drum 100 owing to the loads of the aggregates 1. While the aggregates 1 passing through the front side screening drum 100 are passing through the section in which the reverse rotating members 40 are located, they collide against the bottoms of the reverse rotating members 40 and thus lift or roll so that they are reversely placed in position. Simultaneously, the lightweight foreign substances 2, which are covered pressurizedly with the aggregates 1, are not influenced anymore by the aggregates 1, so that they become in a state of receiving the sucking force. Lastly, the lightweight foreign substances 2, which are not influenced anymore by the aggregates 1 by means of the reverse rotating members 40, are sucked and sorted by the rear side screening drum 100', so they can be sorted more accurately to thus improve the sorting performance of the device.

One or more reverse rotating members 40 may be provided.

Further, the reverse rotating members 40 may have various shapes capable of easily changing the aggregates 1 reversely in position.

Figure 22A:
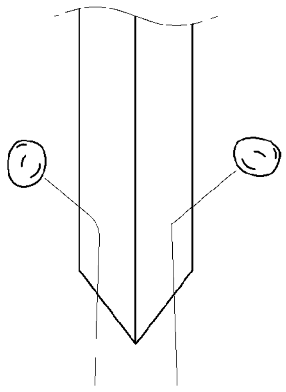
FIGS. 22A to 22C show the reverse rotating members having various shapes.
Figure 22B:
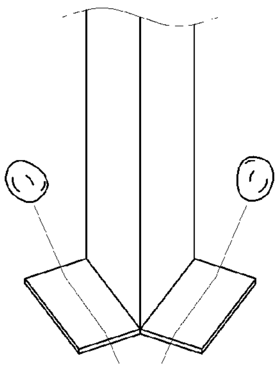
Figure 22C:
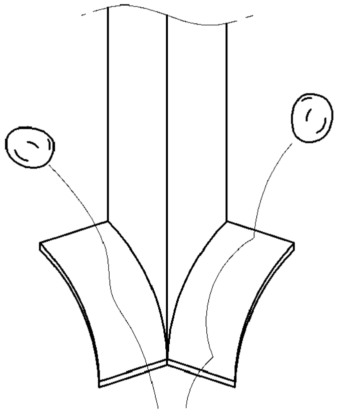

FIGS. 22A to 22C show the reverse rotating members 40 having various shapes. FIG. 22A shows the wedge-type reverse rotating member 40 whose bottom expands in the moving direction of the conveyor belt 10 on plane, FIG. 22B shows the reverse rotating member 40 that has wings attached to the bottom thereof to perform reverse changing in position of the aggregates 1 over a relatively large range, and FIG. 22C shows the reverse rotating member 40 that has wings increasing gradually in height in the advancing direction of the aggregates 1 so that the aggregates 1 lift higher to improve the reverse changing effectiveness in position.

As described above, the drum-type foreign substance suctional attaching and screening device according to the present invention is provided with the screening drum, not with the existing circular track type screen, so that it can be simple in configuration, have a low production cost, and reduce a maintenance cost owing to a low failure rate.

Further, the hood, which is disposed inside the screening drum, has the underside with the shape of the arch, so that the sucking force generated therefrom is applied equally to top of the conveyor belt having the U-shaped section.

Furthermore, the drum-type foreign substance suctional attaching and screening device according to the present invention is simple in configuration to allow the number of screening drums to be appropriately determined in accordance with desired places in the construction waste intermediate treatment facility, without having any interference with other equipment.

Moreover, the foreign substances are transferred attachedly to the outer peripheral surface of the cylindrical screening drum, and if they are discharged in the section where the sucking force is not provided, they can be more gently discharged by means of the centrifugal force generated by the rotation of the screening drum.

Additionally, the return prevention screens are disposed on the outer peripheral surface of the sorting screen of the screening drum, so that the foreign substances transferred attachedly to the sorting screen owing to the remaining sucking force or static electricity can effectively escape from the sorting screen and be easily discharged to the outside.

Further, because the sorting screen modules constituting the sorting screen are replaced with new ones, only the damaged or broken sorting screen modules are replaced rapidly, thereby ensuring easy maintenance.

Furthermore, because the aggregates are reversely changed in position by means of the reverse rotating members, the foreign substances covered pressurizedly with the aggregates can be removed.

In addition, the pair of screening drums is located on both sides of the rotary shaft, thereby improving the sorting efficiency.

Further, the magnetic attaching drum is combined to the screening drum, thereby efficiently sorting the foreign substances having various types and appearances, such as iron foreign substances and lightweight foreign substances.

Furthermore, the screening drum is coupled to one end of the rotary shaft, and otherwise, the pair of screening drums is coupled to both ends of the rotary shaft, so that a single or dual drum type device is configured to thus lower the manufacturing cost and improve the production speed.

In addition, the magnetic force sorter is constituted of only the permanent magnets, thereby making it possible to perform the sorting, without any separate power received.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A drum-type foreign substance suctional attaching and screening device comprising:
   - a screening drum having circular type first and second side plates located on both sides thereof and a sorting screen adapted to surround a space between the first and second side plates;
   - a hood disposed inside the screening drum and open toward a conveyor belt transferring aggregates to be recycled to provide a sucking force generated from a suction fan to the conveyor belt; and a rotary shaft coupled to a center of the first side plate and rotating with the first side plate by power received from outside, wherein the sucking force supplied to the hood is applied to lightweight foreign substances contained in the aggregates transferred along the conveyor belt through the sorting screen, and the lightweight foreign substances are transferred in a rotating direction of the screening drum, while being attached to the sorting screen, and discharged in a section where the sucking force is not provided.

2. The device according to claim 1, wherein the screening drum is disposed parallel to an advancing direction of the conveyor belt.

3. The device according to claim 2, wherein the hood has an underside with a shape of an arch, and the sucking force generated therefrom is applied equally to a top of the conveyor belt having a U-shaped cross-section.

4. The device according to claim 1, wherein the screening drum comprises connection frames adapted to connect the first and second side plates to each other and support the sorting screen.

5. The device according to claim 1, wherein the suction fan is disposed inside or outside the screening drum.

6. The device according to claim 1, further comprising auxiliary wheels adapted to support a load of the screening drum, each auxiliary wheel coming into contact with an outer peripheral surface of the second side plate to interlockingly rotate with the second side plate.

7. The device according to claim 1, wherein the sorting screen is formed by coupling sorting screen modules each defined to a predetermined size to one another.

8. The device according to claim 1, wherein there are a pair of screening drums spaced apart from each other by a predetermined distance, while having first side plates of the pair of screening drums facing each other, hoods are disposed inside the pair of screening drums, and the rotary shaft is coupled to the centers of the first side plates of the pair of screening drums and the pair of screening drums rotate together with the power received from outside.

9. The device according to claim 8, further comprising a support frame for supporting the rotary shaft thereagainst.

10. The device according to claim 8, further comprising cantilever arms adapted to support the hood of one of the pair of screening drums, each cantilever arm having one end fixed to outside of the one of the pair of screening drums and the other end inserted into the one of the pair of screening drums through an open hole of the second side plate thereof.

11. The device according to claim 1, further comprising a magnetic attaching drum configured to have circular type first and second side plates located on both sides thereof, sorting films surrounding a space between the first and second side plates, a magnetic force sorter mounted therein to provide a magnetic force, and the magnetic attaching drum sorting iron foreign substances by the magnetic force, wherein the screening drum is located spaced apart from the magnetic attaching drum by a predetermined distance to allow first side plate of the screening drum to face the first side plate of the magnetic attaching drum, and the rotary shaft is coupled to the centers of the first side plates of the screening drum and the magnetic attaching drum and rotates with the power received from outside, the magnetic force generated from the magnetic force sorter of the magnetic attaching drum is applied to the iron foreign substances transferred along the conveyor belt from the sorting films, and the iron foreign substances are transferred in a rotating direction of the magnetic attaching drum in a state of being attached to the sorting films and discharged in a section where the magnetic force is not provided, thereby sorting the iron foreign substances and the lightweight foreign substances contained in the aggregates transferred along the conveyor belt in one direction sequentially.

12. The device according to claim 11, wherein the magnetic force sorter is configured to have a plurality of magnetic members spaced apart from the sorting films in a lower portion of an inner space of the magnetic attaching drum and each having a plurality of permanent magnets laminated on top of one another, so that and the magnetic force sorter applies the magnetic forces generated from the magnetic members in a downward direction.

13. The device according to claim 12, wherein the magnetic force sorter is configured to allow the plurality of magnetic members to be arranged radially at equal angles on the center points of the first and second side plates, while an undersides of the magnetic members are being located close and parallel to tangent lines of the sorting films.

14. The device according to claim 11, further comprising cantilever arms each having one end fixed to outside of the magnetic attaching drum and the other end inserted into the magnetic attaching drum through an open hole of the second side plate of the magnetic attaching drum, the magnetic force sorter comprising:

fixing brackets disposed on the cantilever arms to fix the cantilever arms thereto; and a plurality of cases spaced apart from the sorting films by the fixing brackets and accommodating magnetic members therein.

* * * * *